US010078585B2

(12) United States Patent
Greiner et al.

(10) Patent No.: US 10,078,585 B2
(45) Date of Patent: *Sep. 18, 2018

(54) CREATING A DYNAMIC ADDRESS TRANSLATION WITH TRANSLATION EXCEPTION QUALIFIERS

(71) Applicant: International Business Machines Corporation, Armonk, NY (US)

(72) Inventors: Dan F Greiner, San Jose, CA (US); Lisa C Heller, Poughkeepsie, NY (US); Damian L Osisek, Endicott, NY (US); Erwin Pfeffer, Bavaria (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,350

(22) Filed: Jul. 27, 2015

(65) Prior Publication Data

US 2015/0339226 A1 Nov. 26, 2015
US 2018/0081800 A9 Mar. 22, 2018

Related U.S. Application Data

(63) Continuation of application No. 14/191,516, filed on Feb. 27, 2014, now Pat. No. 9,092,351, which is a (Continued)

(51) Int. Cl.
*G06F 12/02* (2006.01)
*G06F 3/06* (2006.01)

(52) U.S. Cl.
CPC ........ *G06F 12/0284* (2013.01); *G06F 3/0604* (2013.01); *G06F 3/067* (2013.01);
(Continued)

(58) Field of Classification Search
CPC .. G06F 9/455; G06F 9/45533; G06F 9/45545; G06F 12/10; G06F 12/1009; G06F 12/1027
See application file for complete search history.

(56) References Cited

U.S. PATENT DOCUMENTS 669,043 A 2/1901 Cross
4,669,043 A 5/1987 Kaplinsky
(Continued)

FOREIGN PATENT DOCUMENTS

JP 1125640 5/1989
JP 63308644 12/1998

OTHER PUBLICATIONS

Weaver, David L. et al., "The SPARC Architecture Manual", Version 9, 1994 SPARC International, Inc., San Jose, CA, SAV09R1459912, ISBN 0-13-025001-4, pp. 1-399.
(Continued)

*Primary Examiner* — Hal W Schnee
(74) *Attorney, Agent, or Firm* — Steven Chiu, Esq.; Blanche E. Schiller, Esq.; Heslin Rothenberg Farley & Mesiti P.C.

(57) ABSTRACT

An enhanced dynamic address translation facility product is created such that, in one embodiment, a virtual address to be translated and an initial origin address of a translation table of the hierarchy of translation tables are obtained. Dynamic address translation of the virtual address proceeds. In response to a translation interruption having occurred during dynamic address translation, bits are stored in a translation exception qualifier (TXQ) field to indicate that the exception was either a host DAT exception having occurred while running a host program or a host DAT exception having occurred while running a guest program. The TXQ is further capable of indicating that the exception was associated with a host virtual address derived from a guest page frame real
(Continued)

address or a guest segment frame absolute address. The TXQ is further capable of indicating that a larger or smaller host frame size is preferred to back a guest frame.

20 Claims, 21 Drawing Sheets

Related U.S. Application Data continuation of application No. 13/312,079, filed on Dec. 6, 2011, now Pat. No. 8,683,176, which is a continuation of application No. 12/037,268, filed on Feb. 26, 2008, now Pat. No. 8,095,773.

(52) U.S. Cl.
CPC ...... *G06F 3/0667* (2013.01); *G06F 2212/152* (2013.01); *G06F 2212/50* (2013.01); *G06F 2212/652* (2013.01); *G06F 2212/657* (2013.01)

(56) References Cited

U.S. PATENT DOCUMENTS

| | | | |
|---|---|---|---|
| 4,972,338 A | 11/1990 | Crawford et al. | |
| 4,992,936 A | 2/1991 | Katada et al. | |
| 5,008,811 A | 4/1991 | Scalzi et al. | |
| 5,058,003 A | 10/1991 | White | |
| 5,088,811 A | 2/1992 | Hideshima et al. | |
| 5,551,013 A | 8/1996 | Beausoleil et al. | |
| 5,553,291 A * | 9/1996 | Tanaka | G06F 9/526 |
| | | | 718/1 |
| 5,574,873 A | 11/1996 | Davidian | |
| 5,617,554 A | 4/1997 | Alpert et al. | |
| 5,790,825 A | 8/1998 | Traut | |
| 5,845,331 A | 12/1998 | Carter et al. | |
| 5,917,554 A | 6/1999 | Ohta | |
| 6,009,261 A | 12/1999 | Scalzi et al. | |
| 6,308,255 B1 | 10/2001 | Gorshek, IV et al. | |
| 6,418,522 B1 | 7/2002 | Gaertner et al. | |
| 6,463,582 B1 | 10/2002 | Lethin et al. | |
| 6,574,706 B2 | 6/2003 | Sutherland et al. | |
| 7,120,746 B2 | 10/2006 | Campbell et al. | |
| 7,197,585 B2 | 3/2007 | Farrell et al. | |
| 7,197,601 B2 | 3/2007 | Slegel et al. | |
| 7,234,037 B2 | 6/2007 | Errickson et al. | |
| 7,490,216 B1 * | 2/2009 | Chen | G06F 12/109 |
| | | | 711/202 |
| 7,596,654 B1 * | 9/2009 | Wong | G06F 12/0813 |
| | | | 703/21 |
| 7,647,589 B1 * | 1/2010 | Dobrovolskiy | G06F 11/3644 |
| | | | 710/260 |
| 7,953,588 B2 | 5/2011 | Altman et al. | |
| 8,095,773 B2 | 1/2012 | Greiner et al. | |
| 8,307,448 B2 | 11/2012 | Shimizu et al. | |
| 8,683,176 B2 | 3/2014 | Greiner et al. | |
| 8,843,727 B2 | 9/2014 | Schoinas et al. | |
| 9,092,351 B2 | 7/2015 | Greiner et al. | |
| 2002/0129085 A1 | 9/2002 | Kubala et al. | |
| 2003/0056082 A1 | 3/2003 | Maxfield | |
| 2003/0074541 A1 * | 4/2003 | Plambeck | G06F 12/1027 |
| | | | 711/206 |
| 2004/0024953 A1 * | 2/2004 | Babaian | G06F 12/109 |
| | | | 711/6 |
| 2004/0098719 A1 | 5/2004 | Smith et al. | |
| 2004/0230758 A1 | 11/2004 | Slegel et al. | |
| 2004/0230768 A1 | 11/2004 | Slegel et al. | |
| 2004/0230976 A1 | 11/2004 | Slegel et al. | |
| 2005/0154855 A1 | 7/2005 | Harris et al. | |
| 2005/0268071 A1 | 12/2005 | Blandy et al. | |
| 2005/0289246 A1 | 12/2005 | Easton et al. | |
| 2006/0036824 A1 | 2/2006 | Greiner et al. | |
| 2006/0069899 A1 * | 3/2006 | Schoinas | G06F 12/109 |
| | | | 711/206 |
| 2007/0016904 A1 | 1/2007 | Adlung et al. | |
| 2007/0028072 A1 | 2/2007 | Hennessy et al. | |
| 2007/0101099 A1 * | 5/2007 | Shinohara | G06F 12/1036 |
| | | | 711/207 |
| 2007/0124557 A1 | 5/2007 | Kanai | |
| 2008/0182975 A1 | 7/2008 | Leung | |
| 2009/0037936 A1 * | 2/2009 | Serebrin | G06F 12/0292 |
| | | | 719/318 |
| 2009/0182724 A1 | 7/2009 | Greiner et al. | |
| 2009/0182728 A1 | 7/2009 | Greiner et al. | |
| 2009/0182732 A1 | 7/2009 | Greiner et al. | |
| 2009/0182964 A1 | 7/2009 | Greiner et al. | |
| 2009/0182966 A1 | 7/2009 | Greiner et al. | |
| 2009/0182971 A1 | 7/2009 | Greiner et al. | |
| 2009/0182972 A1 | 7/2009 | Greiner et al. | |
| 2009/0182973 A1 | 7/2009 | Greiner et al. | |
| 2009/0182974 A1 | 7/2009 | Greiner et al. | |
| 2009/0182975 A1 | 7/2009 | Greiner et al. | |
| 2009/0187724 A1 | 7/2009 | Greiner et al. | |
| 2009/0187728 A1 | 7/2009 | Greiner et al. | |
| 2009/0187732 A1 | 7/2009 | Greiner et al. | |
| 2009/0193214 A1 | 7/2009 | Greiner et al. | |
| 2009/0216992 A1 | 8/2009 | Greiner et al. | |
| 2015/0339226 A1 | 11/2015 | Greiner et al. | |
| 2017/0315910 A1 | 11/2017 | Greiner et al. | |

OTHER PUBLICATIONS

Intel 64 and 1A-32 Architectures Software Developer's Manual, vol. 3A, System Programming Guide, Part 1, 253668-936US, Sep. 2010, pp. 1-843, http://www.intel.com/Assets/PDF/manual.253668. pdf (hardcopy of manual submitted with U.S. Appl. No. 11/972,718 to Dan Greiner et al., filed Jan. 11, 2008.
IBM Power ISA, Version 2.03, Sep. 2006, pp. 1-850.
IBM z/VM Built On IBM Virtualization Technology, Generation Information, Version 4, Release 3.0, GC4-5991-04, Fifth Edition, Apr. 2002, pp. 1-119.
IBM System/370 Extended Architecture, Principles of Operation, Publication No. SA22-7085-1, Second Edition, Jan. 1987, pp. 1-584.
IBM z/VM Running Guest Operating Systems, Version 4, Release 3.0, SC24-5997-02, Third Edition, May 2002, pp. 1-179.
IBM, "z/Architecture—Principles of Operation," Chapter 10, IBM Reference No. SA22-7832-06, Feb. 2008, pp. 10-1 thru 10-154 (+ cover sheets).
IBM, "z/Architecture—Principles of Operation," IBM Publication No. SA22-7832-05, 6$^{th}$ Edition, Apr. 2007, pp. 1-1219.
Final Office Action for U.S. Appl. No. 11/972,705 dated Jan. 26, 2011, pp. 1-9.
Final Office Action for U.S. Appl. No. 14/191,516 dated Dec. 5, 2014, pp. 1-13.
Notice of Allowance for U.S. Appl. No. 12/037,268 dated Mar. 10, 2011, pp. 1-17.
Notice of Allowance for U.S. Appl. No. 13/312,079 dated Jul. 13, 2012, pp. 1-5.
Notice of Allowance for U.S. Appl. No. 13/312,079 dated Mar. 13, 2013, pp. 1-3.
Office Action for U.S. Appl. No. 11/972,700 dated Aug. 31, 2010, pp. 1-23.
Office Action for U.S. Appl. No. 11/972,700 dated Mar. 11, 2011, pp. 1-11.
Office Action for U.S. Appl. No. 11/972,705 dated Jul. 22, 2010, pp. 1-8.
Office Action for U.S. Appl. No. 12/037,268 dated Nov. 3, 2010, pp. 1-11.
Office Action for U.S. Appl. No. 13/312,079 dated Mar. 9, 2012, pp. 1-10.
Office Action for U.S. Appl. No. 14/191,516 dated Aug. 13, 2014, pp. 1-15.

\* cited by examiner

**Primary Region-Table or
Segment-Table Designation (R=0)**
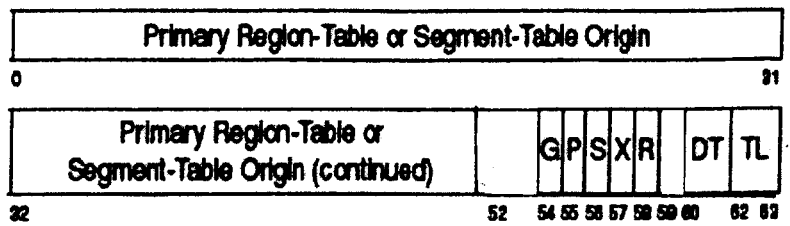
FIG. 13A
Primary Real-Space Designation (R=1)
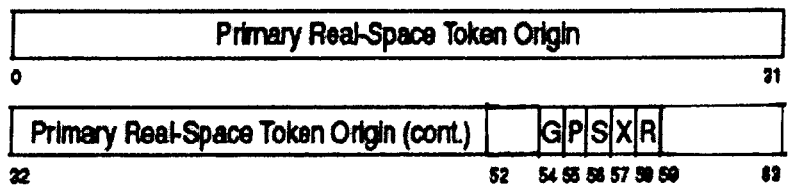
FIG. 13B
| Bits 60 and 61 | Designation Type |
|---|---|
| 11 | Region-first-table |
| 10 | Region-second-table |
| 01 | Region-third-table |
| 00 | Segment-table |
FIG. 13C

**Secondary Region-Table or
Segment-Table Designation (R=0)**

Secondary Real-Space Designation (R=1)

Home Region-Table or
Segment-Table Designation (R=0)

Home Real-Space Designation (R=1)

```
|0 0 0 0 0 0 0 0 0 0 0 0 0 0 0 0 0 0 0 0 0 0 0 0 0 0 0 0 0 0 0 0|
0                                                              31
|0| Prefix Bits 33-50        | / / / / / / / / / / / |
32 33                        51                      63
```
FIG. 17
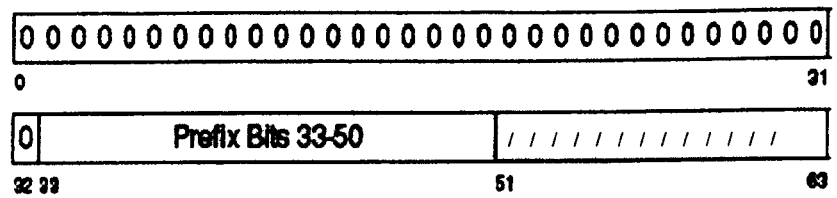
FIG. 18
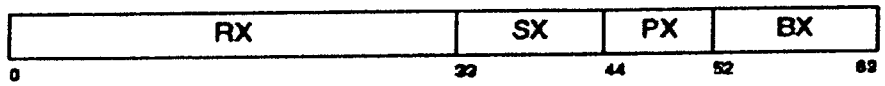
FIG. 19

Region-First-Table Entry (TT=11)

Region-Second-Table Entry (TT=10)

Region-Third-Table Entry (TT=01)

|Bits 60 and 61|Region-Table Level|
|---|---|
|11|First|
|10|Second|
|01|Third|
FIG. 21D
Segment-Table Entry (TT=00, FC=0)
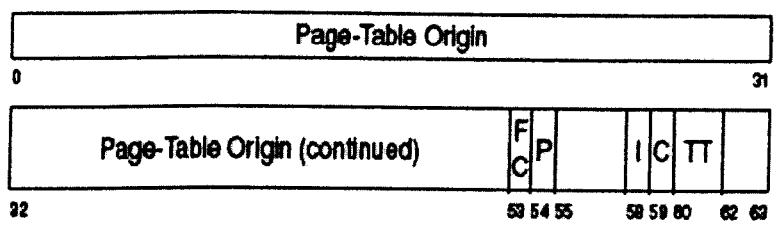
FIG. 22A
Segment-Table Entry (TT=00, FC=1)
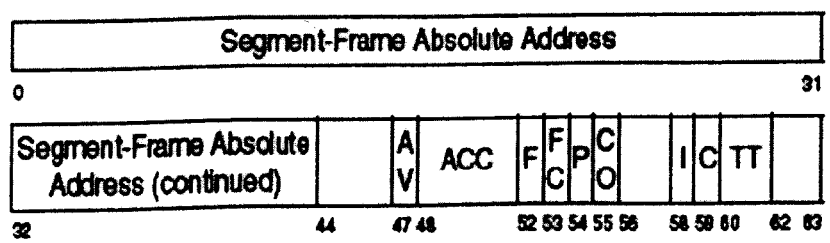
FIG. 22B

| Bits 60 and 61 | Table Level |
|---|---|
| 11 | Region-first |
| 10 | Region-second |
| 01 | Region-third |
| 00 | Segment |

| Bits 60 and 61 | Designation Type | Virtual-Address Portion Translated by the Table |
|---|---|---|
| 11 | Region-first-table | Region first index (bits 0-10) |
| 10 | Region-second-table | Region second index (bits 11-21) |
| 01 | Region-third-table | Region third index (bits 22-32) |
| 00 | Segment-table | Segment index (bits 33-43) |

CREATING A DYNAMIC ADDRESS TRANSLATION WITH TRANSLATION EXCEPTION QUALIFIERS

CROSS-REFERENCE TO RELATED APPLICATIONS

This is a continuation of U.S. patent application Ser. No. 14/191,516, "DYNAMIC ADDRESS TRANSLATION WITH TRANSLATION EXCEPTION QUALIFIER", filed Feb. 27, 2014, which is a continuation of U.S. patent application Ser. No. 13/312,079, "DYNAMIC ADDRESS TRANSLATION WITH TRANSLATION EXCEPTION QUALIFIER", filed Nov. 6, 2011, which is a continuation of U.S. patent application Ser. No. 12/037,268, "DYNAMIC ADDRESS TRANSLATION WITH TRANSLATION EXCEPTION QUALIFIER", filed Feb. 26, 2008, all of which are assigned to International Business Machines Corporation. The disclosures of the foregoing applications are incorporated herein by reference.

FIELD OF THE INVENTION

The present invention relates generally to systems and methods for translating a virtual address in a computer system and, more particularly, to systems and methods of translating a virtual address into a real or absolute address of a block of data in a computer system having a dynamic address translation facility wherein virtual address translation occurs via a hierarchy of translation tables.

BACKGROUND OF THE INVENTION

Dynamic Address Translation (DAT) provides the ability to interrupt the execution of a program at an arbitrary moment, record it and its data in auxiliary storage, such as a direct access storage device, and at a later time return the program and the data to different main storage (memory) locations for resumption of execution. The transfer of the program and its data between main and auxiliary storage may be performed piecemeal, and the return of the information to main storage may take place in response to an attempt by the CPU to access it at the time it is needed for execution. These functions may be performed without change or inspection of the program and its data, do not require any explicit programming convention in the relocated program, and do not disturb the execution of the program except for the time delay involved.

With appropriate support by an operating system, the dynamic address translation facility may be used to provide to a user a system wherein storage appears to be larger than the main storage which is available in the configuration. This apparent main storage is often referred to as virtual storage, and the addresses used to designate locations in the virtual storage are often referred to as virtual addresses. The virtual storage of a user may far exceed the size of the main storage which is available in the configuration and normally is maintained in auxiliary storage. The virtual storage is considered to be composed of blocks of data, commonly called pages (also referred to as segments and regions). Only the most recently referred to pages of the virtual storage are assigned to occupy blocks of physical main storage. As the user refers to pages of virtual storage that do not appear in main storage, they are brought in to replace pages in main storage that are less likely to be needed. In some cases, virtual storage is assigned to main storage for a long period of time (or permanently), regardless of whether the storage is referenced. The swapping of pages of storage may be performed by the operating system without the user's knowledge.

Programs use addresses (or virtual addresses) to access virtual storage. The program may fetch instructions from virtual storage or load data or store data from virtual storage using virtual addresses. The virtual addresses associated with a range of virtual storage define an address space. With appropriate support by an operating system, the dynamic address translation facility may be used to provide a number of address spaces. These address spaces may be used to provide degrees of isolation between users. Such support can consist of completely different address space for each user, thus providing complete isolation, or a shared area may be provided by mapping a portion of each address space to a single common storage area. Also, instructions are provided which permit a semi-privileged program to access more than one such address space.

Dynamic address translation provides for the translation of virtual addresses from multiple different address spaces. On an IBM® System z processor, for example, these address spaces are called primary address space, secondary address space, and Access Register specified address spaces. A privileged program can also cause the home address space to be accessed. Dynamic address translation may be specified for instruction and data addresses generated by the CPU.

As is common in the art, DAT is performed by using successive portions of the virtual address as indices to select entries in a series of translation tables (for example, region first, region second, region third, segment and page tables). Each intermediate table entry, if marked valid, contains the origin, offset and length of the next-lower-level table, which is then indexed by the next portion of the virtual address, until a "leaf" entry is reached, containing a real or absolute frame address. The remaining portion of the virtual address is then used as a byte index into that frame to complete the translation result.

Virtualization is used to improve efficiency and flexibility in computing environments. Prior to virtualization, a single operating system typically ran in a machine. In a virtualized environment, a hypervisor program or host is in control of machine resources. This host creates multiple virtual machines, containers in which separate, independent operating system instances, called guests, can run, sharing resources such as processors and memory under control of the host.

In a pageable-guest (virtual machine) environment on, for example, an IBM® System z processor, dynamic address translation occurs at two levels: a guest virtual page is backed by a guest real frame, and these guest frames are in turn represented as host virtual memory, divided into host virtual pages which are backed by host real frames. Since address translation is managed independently by guest and host, a guest frame of either size may be mapped into host virtual area comprised of pages of either size. Thus, a guest frame might consist of one host page, many host pages (large guest frame in small host pages), or a portion of a host page (small guest frames in a large host page). Memory can be managed more efficiently, and the translation lookaside buffer (TLB) in the machine can be used more efficiently, when the host uses the same size page as the guest frame it backs. So, for example, a guest 1 Megabyte frame is treated as a unit by the guest, and should be backed by a host 1 Megabyte frame, rather than 256 separately paged 4 Kilobyte frames. This allows a single TLB entry to map the entire megabyte of guest virtual addresses to the corresponding host absolute addresses.

In order that the host page size conforms to the guest frame size, the host must be able to determine what size frames the guest intends to use in different areas of guest memory. In some cases, the guest may utilize a frame management instruction which indicates the intended guest frame size, and handling of that instruction by the firmware or the host can then provide a host frame conforming in size to back the guest frame. However, if the guest does not use this instruction at time of deployment, or if it later changes the frame size, host and guest sizes may no longer conform. In particular, if the host has paged out a portion of guest memory and the guest then references it, a host translation exception ensues, so that the host has the opportunity to provide backing memory with the preferred guest frame contents. This interruption affords an additional opportunity for the host to assign a frame conforming in size to the guest frame.

What is needed is an enhanced dynamic address translation facility which provides additional functionality, heretofore unknown to this art, which effectively and efficiently informs the host processor to allocate a properly sized frame with which to back the guest frame in response to whether the interruption was caused by executing in a host or guest configuration and, if in a guest configuration, whether the interruption pertains to a guest large or small frame identified by a leaf guest DAT-table entry, or to a guest frame referenced in some other way.

SUMMARY OF THE INVENTION

What is provided are a system, method, and computer program product, providing a translation exception qualifier for a dynamic address translation facility which translates a virtual address into a real or absolute address of a block of data in main storage of a computer system having a machine architecture.

In one example embodiment, a virtual address to be translated is obtained. An origin address of a first translation table of a hierarchy of translation tables used in translation is obtained. The hierarchy of translation tables consists of one or more of a region first table, a region second table, a region third table, a segment table, and optionally a page table. Dynamic address translation of the virtual address into a real or absolute address of a block of data in main storage proceeds. If translation cannot be completed, for example, if one of the table entries needed for the translation is marked invalid, then a translation exception interruption occurs. In response to a host translation exception interruption event having occurred during translation of the virtual address, bits are stored in a translation exception qualifier to indicate that the translation exception was one of a host DAT exception having occurred while running a host program, and a host DAT exception having occurred while running a guest program. The TXQ field is capable of also indicating that the translation exception was a guest DAT exception having occurred while running the guest program; that the host DAT exception pertained to an address derived from a guest leaf table entry; that the host DAT exception pertained to an address derived from a guest page frame real address; and that the host DAT exception pertained to an address derived from a guest segment frame absolute address. The TXQ field is capable of further indicating a size of a guest frame to which the host DAT exception pertains and that a larger or smaller frame size is needed, so that the host or firmware can provide a proper size of host frame with which to back a guest frame. Other embodiments are provided.

The invention will next be described in connection with certain illustrated embodiments. It should be understood that various changes and modifications can be made by those skilled in the art without departing from the spirit or scope of the invention.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 13A-13B depict example formats of control register 1;

FIG. 13C depicts example designation types;

FIG. 17 depicts one example format of a prefix register;

FIG. 18 depicts examples of various modes and the handling of addresses;

FIG. 19 depicts one example format of a virtual address;

FIG. 21D depicts example table type bits;

FIGS. 22A-22B depict example formats of segment table entries;

DETAILED DESCRIPTION

Figure 1:
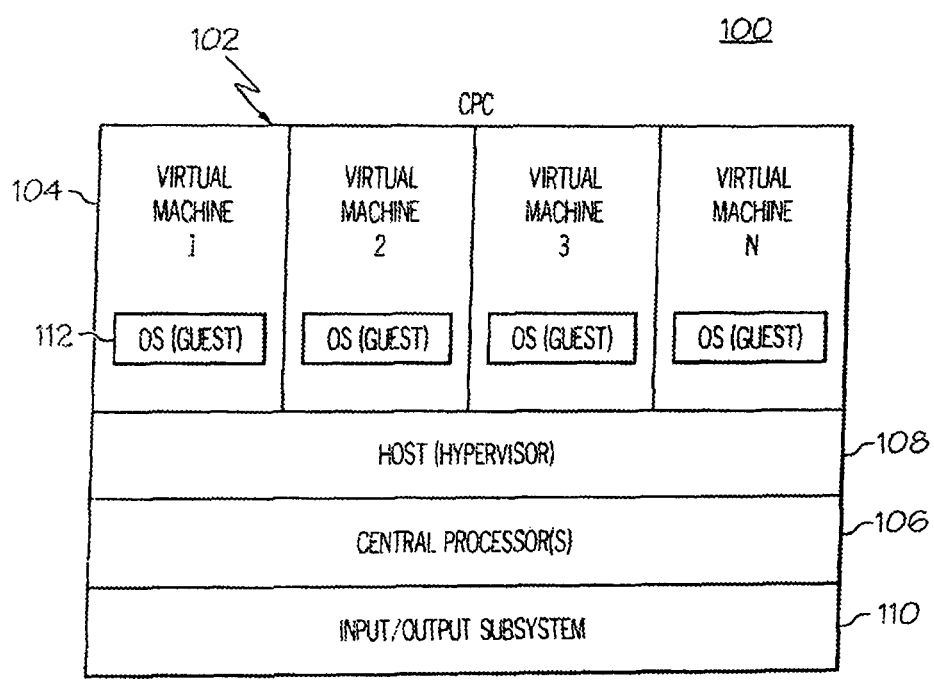
FIG. 1 illustrates one embodiment of a prior art host computer system wherein guest and host enhanced dynamic address translation will be performed.

It should be understood that statements made in the specification of the present application do not necessarily limit any of the various claimed inventions. Moreover, some statements may apply to some inventive features but not to others. Unless otherwise indicated, singular elements may be in the plural and vice versa with no loss of generality.

One of ordinary skill in this art would be readily familiar with addressing storage in a computing environment and using bits in a register or address field to indicate differing states and acting on those states. Further, one of ordinary skill in this art would be knowledgeable in the art of computer software and knowledgeable about the workings and interrelationships between components of computer systems sufficient to implement the teachings hereof in their own computing environments without undue experimentation.

OVERVIEW

What is provided is an example embodiment of an enhanced Dynamic Address Translation (DAT) facility. When the enhanced DAT facility is installed and enabled, DAT translation may produce either a page frame real address or a segment frame absolute address, determined by the Segment Table Entry (STE) format control in the segment table entry. As used herein, the term "enhanced DAT applies" means all of the following are true: 1) The EDAT facility is installed; 2) The EDAT facility is enabled via control register 0 (CR0) bit 40; and, 3) The address is translated by means of DAT-table entries.

When enhanced DAT applies, the following additional function is available in the DAT process:

A DAT protection bit is added to region table entries, providing function similar to the DAT protection bits in the segment and page table entries.

A STE format control is added to the segment table entry. When the STE format control is zero, DAT proceeds as is currently defined, except that a change recording override in the page table entry indicates whether setting of the change bit may be bypassed for the page.

When the STE format control is one, the segment table entry also contains the following:

A segment frame absolute address (rather than a page table origin) specifying the absolute storage location of the 1 Megabyte block.

Access control bits and a fetch protection bit which optionally may be used in lieu of the corresponding bits in the segment's individual storage keys.

A bit which determines the validity of the access control bits and the fetch protection bit in the segment table entry.

A change recording override which indicates whether setting of the change bit may be bypassed in the segment's individual storage keys.

A translation-exception qualifier (TXQ) is stored when a DAT exception interruption occurs, to provide details as to the execution environment (host or guest) in which the exception occurred, and the source of the address that was being translated.

Host Computer System

An emulated system includes an emulator program which emulates a computer system that can provide both a host architecture and an interpretive-execution capability. The emulated system memory may contain both host and pageable guests. A host program running in an emulated host architecture can Start Interpretive Execution of a guest program, which then runs under emulation of the interpretive-execution facility. One example of an interpretive-execution facility and a Start Interpretive Execution (SIE) instruction for executing pageable guests is described in "IBM® System/370 Extended Architecture", IBM® Pub. No. SA22-7095 (1985), which is incorporated herein by reference in its entirety.

Reference is now being made to FIG. 1 which illustrates one embodiment of a host computer system 100 wherein guest and host enhanced dynamic address translation will be performed Host computing environment 100 is preferably based on the z/Architecture® offered by International Business Machines Corporation (IBM), Armonk, N.Y. The z/Architecture® is more fully described in: "*z/Architecture® Principles of Operation*", IBM® Pub. No. SA22-7832-05, 6$^{th}$ Edition, (April 2007), which is incorporated by reference herein in its entirety. Computing environments based on the z/Architecture® include, for example, eServer and zSeries®, both by IBM®.

Computing environment 100 includes a central processor complex (CPC) 102 providing virtual machine support. CPC 102 includes, for instance, one or more virtual machines 104, one or more processors 106, at least one host 108 (e.g., a control program such as a hypervisor), and an input/output subsystem 110. The virtual machine support of the CPC provides the ability to operate large numbers of virtual machines, each capable of hosting a guest operating system 112, such as Linux.

Each virtual machine is capable of functioning as a separate system. That is, each virtual machine can be independently reset, host contain a guest operating system, and operate with different programs. An operating system or application program running in a virtual machine appears to have access to a full and complete system, but in reality, only a portion of it is available.

In this particular example, the model of virtual machines is a V=V model, in which the memory of a virtual machine is backed by virtual memory, instead of real memory. Each virtual machine has a virtual linear memory space. The physical resources are owned by the host, and the shared physical resources are dispatched by the host to the guest operating systems, as needed, to meet their processing demands. This V=V virtual machine model assumes that the interactions between the guest operating systems and the physical shared machine resources are controlled by the host, since the large number of guests typically precludes the host from simply partitioning and assigning the hardware resources to the configured guests. One or more aspects of the V=V model are more fully described in: "*z/VM: Running*

Guest Operating Systems", IBM® Pub. No. SC24-5997-02, (2001), which is hereby incorporated herein by reference in its entirety.

Central processors 106 are physical processor resources that are assignable to a virtual machine. For instance, virtual machine 104 includes one or more virtual processors, each of which represents all or a share of a physical processor resource that may be dynamically allocated to the virtual machine. Virtual machines are managed by the host. The host may be implemented in microcode running on one or more processors or be part of a host operating system executing on the machine. In one example, the host is a VM hypervisor such as z/VM® offered by IBM®. One embodiment of z/VM® is more fully described in: "z/VM: General Information Manual", IBM® Pub. No. GC24-5991-04, (2001), which is hereby incorporated herein by reference in its entirety.

Input/output system 110 directs the flow of information between devices and main storage. It is coupled to the central processing complex. It can be part of the central processing complex or separate therefrom. The I/O subsystem relieves the central processors of the task of communicating directly with the I/O devices coupled to CPC and permits data processing to proceed concurrently with I/O processing.

The Central Processors 106 may have a Dynamic Address Translation (DAT) facility (function or unit) for transforming program addresses (virtual addresses) into real address of memory. A DAT facility typically includes a translation lookaside buffer for caching translations so that later accesses to the block of computer memory do not require the delay of address translation. Typically a cache is employed between the computer memory and the processor. The cache may be hierarchical having a large cache available to more than one CPU and smaller, faster (lower level) caches between the large cache and each CPU. In some implementations the lower level caches are split to provide separate low level caches for instruction fetching and data accesses. In an embodiment, an instruction is fetched from memory by an instruction fetch unit via a cache. The instruction is decoded in an instruction decode unit and dispatched (with other instructions in some embodiments) to instruction execution units. Typically several execution units are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory, a load store unit typically handles the access under control of the instruction being executed.

In an embodiment, the invention may be practiced by software (sometimes referred to Licensed Internal Code (LIC), firmware, micro-code, milli-code, pico-code and the like, any of which would be consistent with the present invention). Software program code which embodies the present invention is typically accessed by the processor also known as a CPU (Central Processing Unit) of computer system from a long term storage media, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory or storage of one computer system over a network to other computer systems for use by users of such other systems.

Alternatively, the program code may be embodied in the memory, and accessed by the processor using the processor bus. Such program code includes an operating system which controls the function and interaction of the various computer components and one or more application programs. Program code is normally paged from dense storage media to a high speed memory where it is available for processing by the processor. The techniques and methods for embodying software program code in memory, on physical media, and/or distributing software code via networks are well known and will not be further discussed herein. Program code, when created and stored on a tangible medium (including but not limited to electronic memory modules (RAM), flash memory, compact discs (CDs), DVDs, magnetic tape and the like is often referred to as a "computer program product". The computer program product medium is typically readable by a processing circuit preferably in a computer system for execution by the processing circuit.

Figure 2:
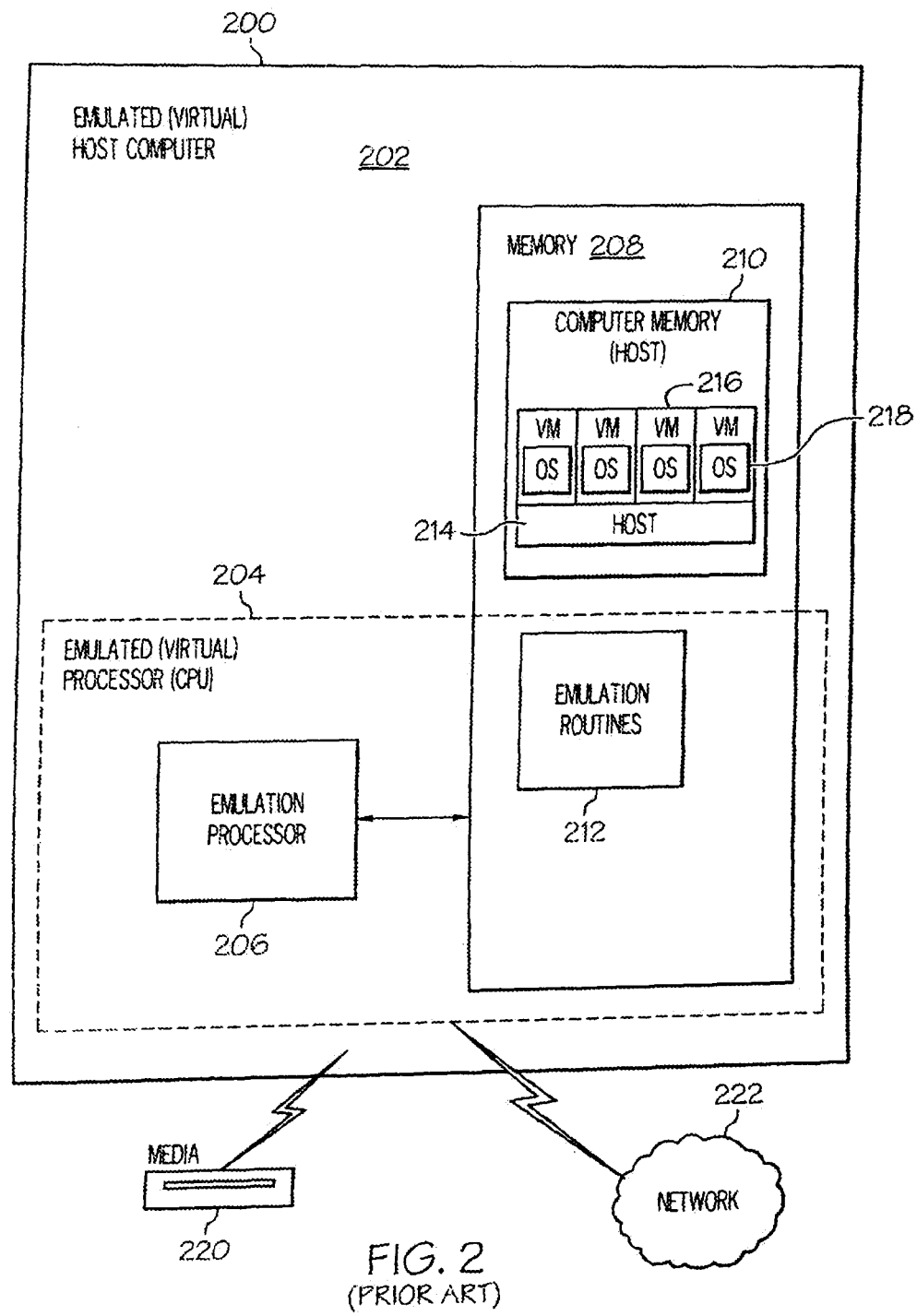
FIG. 2 provides an example prior art emulated host computer system that emulates the host computer system of a host architecture.

Another example of a computing environment to incorporate one or more aspects of the present invention is depicted in FIG. 2. In this example, an emulated host computer system 200 is provided that emulates a host computer system 202 of a host architecture. Emulated host processor 204 (or virtual host processor) is realized through an emulation processor 206 having a different native instruction set architecture than used by the processors of the host computer. Emulated host computer system has memory 208 accessible to emulation processor 206. In the example embodiment, memory 208 is partitioned into a host computer memory 210 portion and an emulation routines 212 portion. Host computer memory 210 is available to programs of emulated host computer 202 and may contain both a host or hypervisor 214 and one or more virtual machines 216 running guest operating systems 218, analogous to the like-named elements in FIG. 1. Emulation processor 206 executes native instructions of an architected instruction set of an architecture other than that of the emulated processor; the native instructions are obtained, for example, from emulation routines memory 212. Emulation processor 206 may access a host instruction for execution from a program in host computer memory 210 by employing one or more instruction(s) obtained in a sequence & access/decode routine which may decode the host instruction(s) accessed to determine a native instruction execution routine for emulating the function of the host instruction accessed. One such host instruction may be, for example, a Start Interpretive Execution (SIE) instruction, by which the host seeks to execute a program in a virtual machine. The emulation routines 212 may include support for this instruction, and for executing a sequence of guest instructions in a virtual machine in accordance with the definition of this SIE instruction.

Other facilities that are defined for the host computer system architecture may be emulated by architected facilities routines, including such facilities as general purpose registers, control registers, dynamic address translation, and I/O subsystem support and processor cache for example. The emulation routines may also take advantage of functions available in the emulation processor 206 (such as general registers and dynamic translation of virtual addresses) to improve performance of the emulation routines. Special hardware and offload engines may also be provided to assist the processor in emulating the function of the host computer. The host computer, in one embodiment, is in communication with a variety of known storage media 220, such as, for example, a diskette, hard drive, or CD-ROM. Software program code may be distributed on such media or may be distributed to users over a network 222.

Computer Processor and Registers

In an embodiment, a CPU's program instruction functionality communicates with a plurality of registers over a communication bus. The communication bus may be internal or external to the CPU. Some registers may be read only. Other hardware and/or software may also read/write to one or more of the registers accessible by the CPU. An instruction operation code (opcode) determines which type of register is to be used in any particular machine instruction operation.

General Registers

Instructions may designate information in one or more of 16 general registers. The general registers may be used as base address registers and index registers in address arithmetic and as accumulators in general arithmetic and logical operations. Each register contains 64 bit positions. The general registers are identified by the numbers 0-15 and are designated by a four bit R field in an instruction. Some instructions provide for addressing multiple general registers by having several R fields. For some instructions, the use of a specific general register is implied rather than explicitly designated by an R field of the instruction.

For some operations, either bits 32-63 or bits 0-63 of two adjacent general registers are coupled, providing a 64-bit or 128-bit format, respectively. In these operations, the program must designate an even numbered register, which contains the leftmost (high order) 32 or 64 bits. The next higher numbered register contains the rightmost (low order) 32 or 64 bits. In addition to their use as accumulators in general arithmetic and logical operations, 15 of the 16 general registers are also used as base address and index registers in address generation. In these cases, the registers are designated by a four bit B field or X field in an instruction. A value of zero in the B or X field specifies that no base or index is to be applied, and, thus, general register 0 cannot be designated as containing a base address or index.

Control Registers

The control registers provide for maintaining and manipulating control information outside the program status word. The CPU has 16 control registers, each having 64 bit positions. The bit positions in the registers are assigned to particular facilities in the system, such as program event recording, and are used either to specify that an operation can take place or to furnish special information required by the facility. The control registers are identified by the numbers 0-15 and are designated by four bit R fields in the instructions LOAD CONTROL and STORE CONTROL. Multiple control registers can be addressed by these instructions.

Control Register 1

Control register 1 contains the Primary Address Space Control Element (PASCE). In one embodiment, control register 1 has one of two formats, depending on the real space control bit (R) in the register, as depicted in FIGS. 13A-13B.

Format of Control Register 1

Selected fields in the Primary Address Space Control Element (PASCE) are allocated as follows:

Primary Region Table or Segment Table Origin:

Bits 0-51 of the primary region table or segment table designation in control register 1, with 12 zeros appended on the right, form a 64-bit address that designates the beginning of the primary region table or segment table. It is unpredictable whether the address is real or absolute. This table is called the primary region table or segment table since it is used to translate virtual addresses in the primary address space.

Primary Real Space Control (R):

If bit 58 of control register 1 is zero, the register contains a region table or segment table designation. If bit 58 is one, the register contains a real space designation. When bit 58 is one, a one value of the common segment bit in a translation lookaside buffer representation of a segment table entry prevents the entry and the translation lookaside buffer page table copy it designates from being used when translating references to the primary address space, even with a match between the token origin in control register 1 and the table origin in the translation lookaside buffer entry.

Primary Designation Type Control (DT):

When R is zero, the type of table designation in control register 1 is specified by bits 60 and 61 in the register, as shown in FIG. 13C.

Primary Designation Type (DT) Control Bits

When R is zero, bits 60 and 61 must be 11 binary when an attempt is made to use the PASCE to translate a virtual address in which the leftmost one bit is in bit positions 0-10 of the address. Similarly, bits 60 and 61 must be 11 or 10 binary when the leftmost one bit is in bit positions 11-21 of the address, and they must be 11, 10, or 01 binary when the leftmost one bit is in bit positions 22-32 of the address. Otherwise, an ASCE-type exception is recognized.

Primary Region Table or Segment Table Length (TL):

Bits 62 and 63 of the primary region table designation or segment table designation in control register 1 specify the length of the primary region table or segment table in units of 4,096 bytes, thus making the length of the region table or segment table variable in multiples of 512 entries. The length of the primary region table or segment table, in units of 4,096 bytes, is one more than the TL value. The contents of the length field are used to establish whether the portion of the virtual address (RFX, RSX, RTX, or SX) to be translated by means of the table designates an entry that falls within the table.

Primary Real Space Token Origin:

Bits 0-51 of the primary real space designation in control register 1, with 12 zeros appended on the right, form a 64-bit address that may be used in forming and using translation lookaside buffer entries that provide a virtual equals real translation for references to the primary address space. Although this address is used only as a token and is not used to perform a storage reference, it still must be a valid address; otherwise, an incorrect translation lookaside buffer entry may be used when the contents of control register 1 are used.

The following bits of control register 1 are not assigned and are ignored: bits 52, 53, and 59 if the register contains a region table designation or segment table designation, and bits 52, 53 and 59-63 if the register contains a real space designation.

Control Register 7

Figure 14A:
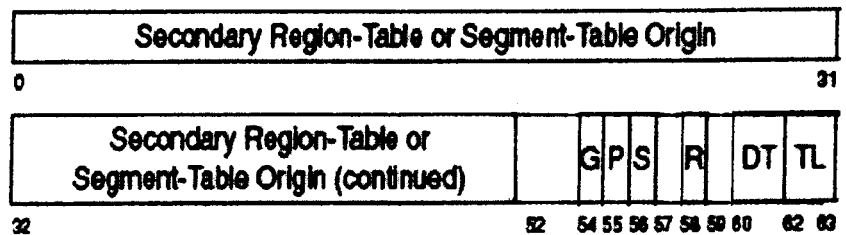
FIGS. 14A-14B depict example formats of control register 7.
Figure 14B:
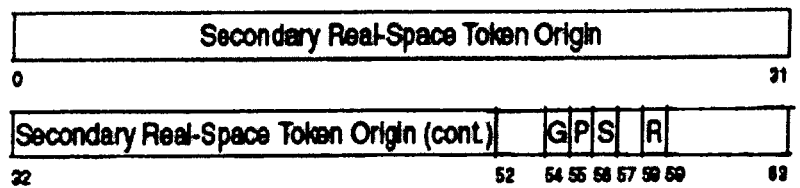

Control register 7 contains the Secondary Address Space Control Element (SASCE). In one embodiment, control register 7 has one of two formats, depending on the real space control bit (R) in the register, as shown in FIGS. 14A-14B.

Format of Control Register 7

Control Register 13

Figure 15A:
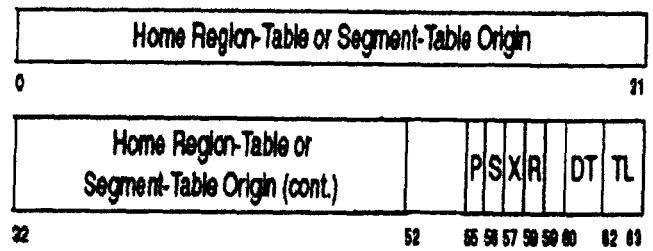
FIGS. 15A-15B depict example formats of control register 13.
Figure 15B:
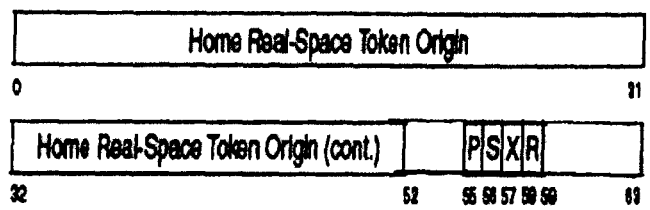

Control register 13 contains the Home Address Space Control Element (HASCE). In one embodiment, control register 13 has one of two formats, depending on the real space control bit (R) in the register, as shown in FIGS. 15A-15B.

Format of Control Register 13
Access Registers

The CPU has 16 access registers numbered 0-15. An access register consists of 32 bit positions containing an indirect specification of an ASCE. An ASCE is a parameter used by the dynamic address translation (DAT) mechanism to translate references to a corresponding address space. When the CPU is in a mode called the access register mode (controlled by bits in the program status word), an instruction B field, used to specify a logical address for a storage operand reference, designates an access register, and the ASCE specified by the access register is used by DAT for the reference being made. For some instructions, an R field is used instead of a B field. Instructions are provided for loading and storing the contents of the access registers and for moving the contents of one access register to another.

Each of access registers 1-15 can designate any address space, including the current instruction space (the primary address space). Access register 0 designates the primary instruction space. When one of access registers 1-15 is used to designate an address space, the CPU determines which address space is designated by translating the contents of the access register. When access register 0 is used to designate an address space, the CPU treats the access register as designating the primary instruction space, and it does not examine the actual contents of the access register. Therefore, the 16 access registers can designate, at any one time, the primary instruction space and a maximum of 15 other spaces.

Program Status Word (PSW)

The program status word includes the instruction address, condition code, and other information used to control instruction sequencing and to determine the state of the CPU. The active or controlling program status word is called the current program status word. It governs the program currently being executed.

The CPU has an interruption capability, which permits the CPU to switch rapidly to another program in response to exceptional conditions and external stimuli. When an interruption occurs, the CPU places the current program status word in an assigned storage location, called the old program status word location, for the particular class of interruption. The CPU fetches a new program status word from a second assigned storage location. This new program status word determines the next program to be executed. When it has finished processing the interruption, the program handling the interruption may reload the old program status word, making it again the current program status word, so that the interrupted program can continue.

There are six classes of interruption: external, I/O, machine check, program, restart, and supervisor call. Each class has a distinct pair of old program status word and new program status word locations permanently assigned in real storage.

Current Program Status Word

The current program status word in the CPU contains information required for the execution of the currently active program. The program status word is 128 bits in length and includes the instruction address, condition code, and other control fields. In general, the program status word is used to control instruction sequencing and to hold and indicate much of the status of the CPU in relation to the program currently being executed. Additional control and status information is contained in control registers and permanently assigned storage locations. The status of the CPU can be changed by loading a new program status word or part of a program status word.

Control is switched during an interruption of the CPU by storing the current program status word, so as to preserve the status of the CPU, and then loading a new program status word. Execution of LOAD PSW or LOAD PSW EXTENDED, or the successful conclusion of the initial program loading sequence, introduces a new program status word. The instruction address is updated by sequential instruction execution and replaced by successful branches. Other instructions are provided which operate on a portion of the program status word.

Figure 16:
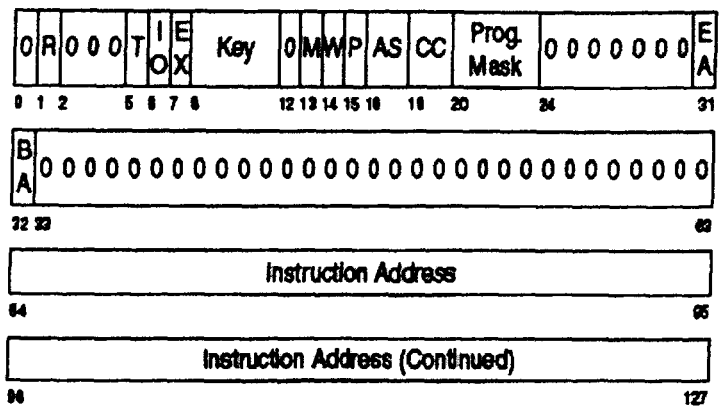
FIG. 16 depicts one example format of a program status word.

A new or modified program status word becomes active (that is, the information introduced into the current program status word assumes control over the CPU) when the interruption or the execution of an instruction that changes the program status word is completed. The interruption for Program Event Recording (PER) associated with an instruction that changes the program status word occurs under control of the PER mask that is effective at the beginning of the operation. Bits 0-7 of the program status word are collectively referred to as the system mask. In one embodiment, the program status word has the format shown in FIG. 16.

Program Status Word Format

The following is a brief summary of the functions of selected program status word fields.

DAT Mode (T):

Bit 5 controls whether implicit dynamic address translation of logical and instruction addresses used to access storage takes place. When bit 5 is zero, DAT is off and logical and instruction addresses are treated as real addresses. When bit 5 is one, DAT is on, and the dynamic address translation mechanism is invoked.

PSW Key:

Bits 8-11 form the access key for storage references by the CPU. If the reference is subject to key controlled protection, the PSW Key is matched with a storage key when information is stored or when information is fetched from a location that is protected against fetching. However, for one of the operands of each of MOVE TO PRIMARY, MOVE TO SECONDARY, MOVE WITH KEY, MOVE WITH SOURCE KEY, and MOVE WITH DESTINATION KEY, an access key specified as an operand is used instead of the PSW Key.

Address Space Control (AS):

Bits 16 and 17, in conjunction with Program Status Word bit 5, control the translation mode.

Condition Code (CC):

Bits 18 and 19 are the two bits of the condition code. The condition code is set to 0, 1, 2, or 3, depending on the result obtained in executing certain instructions. Most arithmetic and logical operations, as well as some other operations, set the condition code. The instruction BRANCH ON CONDITION can specify any selection of the condition code values as a criterion for branching.

Instruction Address:

Bits 64-127 of the program status word are the instruction address. This address designates the location of the leftmost byte of the next instruction to be executed, unless the CPU is in the wait state (bit 14 of the program status word is one).

Address Types & Formats

For purposes of addressing main storage, three basic types of addresses are recognized: absolute, real, and virtual. The addresses are distinguished on the basis of the transformations that are applied to the address during a storage access. Address translation converts a virtual address to a real address. Prefixing converts a real address to an absolute address. In addition to the three basic address types, additional types are defined which are treated as one or another of the three basic types, depending on the instruction and the current mode.

Absolute Address

An absolute address is the address assigned to a main storage location. An absolute address is used for a storage access without any transformations performed on it. The channel subsystem and all CPUs in the configuration refer to a shared main storage location by using the same absolute address. Available main storage is usually assigned contiguous absolute addresses starting at 0, and the addresses are assigned in complete 4 Kilobyte blocks on integral boundaries. An exception is recognized when an attempt is made to use an absolute address in a block which has not been assigned to physical locations. On some models, storage reconfiguration controls may be provided which permit the operator to change the correspondence between absolute addresses and physical locations. However, at any one time, a physical location is not associated with more than one absolute address. Storage consisting of byte locations sequenced according to their absolute addresses is referred to as absolute storage.

Real Address

A real address identifies a location in real storage. When a real address is used for an access to main storage, it is converted, by means of prefixing, to form an absolute address. At any instant there is one real address to absolute address mapping for each CPU in the configuration. When a real address is used by a CPU to access main storage, it may be converted to an absolute address by prefixing. The particular transformation is defined by the value in the prefix register for the CPU. Storage consisting of byte locations sequenced according to their real addresses is referred to as real storage.

Virtual Address

A virtual address identifies a location in virtual storage. When a virtual address is used for an access to main storage, it is translated by means of dynamic address translation, either to a real address which may be subject to prefixing to form an absolute address, or directly to an absolute address.

Primary Virtual Address

A primary virtual address is a virtual address which is to be translated by means of the Primary Address Space Control Element (PASCE). Logical addresses are treated as primary virtual addresses when in the primary space mode. Instruction addresses are treated as primary virtual addresses when in the primary space mode, secondary space mode, or access register mode. The first operand address of MOVE TO PRIMARY and the second operand address of MOVE TO SECONDARY are treated as primary virtual addresses. In addition, when a pageable guest is executing, the main storage (memory) which the guest views as absolute storage is represented in the host's primary address space; that is, guest absolute addresses are treated as host primary virtual addresses.

Secondary Virtual Address

A secondary virtual address is a virtual address which is to be translated by means of the Secondary Address Space Control Element (SASCE). Logical addresses are treated as secondary virtual addresses when in the secondary space mode. The second operand address of MOVE TO PRIMARY and the first operand address of MOVE TO SECONDARY are treated as secondary virtual addresses.

AR Specified Virtual Address

An AR specified virtual address is a virtual address which is to be translated by means of an Access Register-specified Address Space Control Element. Logical addresses are treated as AR specified addresses when in the access register mode.

Home Virtual Address

A home virtual address is a virtual address which is to be translated by means of the Home Address Space Control Element (HASCE). Logical addresses and instruction addresses are treated as home virtual addresses when in the home space mode.

Instruction Address

Addresses used to fetch instructions from storage are called instruction addresses. Instruction addresses are treated as real addresses in the real mode, as primary virtual addresses in the primary space mode, secondary space mode, or access register mode, and as home virtual addresses in the home space mode. The instruction address in the current program status word and the target address of EXECUTE are instruction addresses.

Effective Address

In some situations, it is convenient to use the term "effective address." An effective address is the address which exists before any transformation by dynamic address translation or prefixing is performed. An effective address may be specified directly in a register or may result from address arithmetic. Address arithmetic is the addition of the base and displacement or of the base, index, and displacement.

Prefixing

Prefixing provides the ability to assign the range of real addresses 0-8191 to a different block in absolute storage for each CPU, thus permitting more than one CPU sharing main storage to operate concurrently with a minimum of interference, especially in the processing of interruptions. Prefixing causes real addresses in the range 0-8191 to correspond one-for-one to the block of 8K byte absolute addresses (the prefix area) identified by the value in bit positions 0-50 of the prefix register for the CPU, and the block of real addresses identified by that value in the prefix register to correspond one-for-one to absolute addresses 0-8191. The remaining real addresses are the same as the corresponding absolute addresses. This transformation allows each CPU to access all of main storage, including the first 8K bytes and the locations designated by the prefix registers of other CPUs.

The prefix is a 51-bit quantity contained in bit positions 0-50 of the prefix register. In one embodiment, the prefix register has the format shown in FIG. 17.

Format of Prefix Register

When prefixing is applied, the real address is transformed into an absolute address by using one of the following rules, depending on bits 0-50 of the real address:

1. Bits 0-50 of the address, if all zeros, are replaced with bits 0-50 of the prefix.
2. Bits 0-50 of the address, if equal to bits 0-50 of the prefix, are replaced with zeros.
3. Bits 0-50 of the address, if not all zeros and not equal to bits 0-50 of the prefix, remain unchanged.

Only the address presented to storage is translated by prefixing. The contents of the source of the address remain unchanged.

The distinction between real and absolute addresses is made even when the prefix register contains all zeros, in which case a real address and its corresponding absolute address are identical.

Relationship between Real and Absolute Addresses

Figure 12:
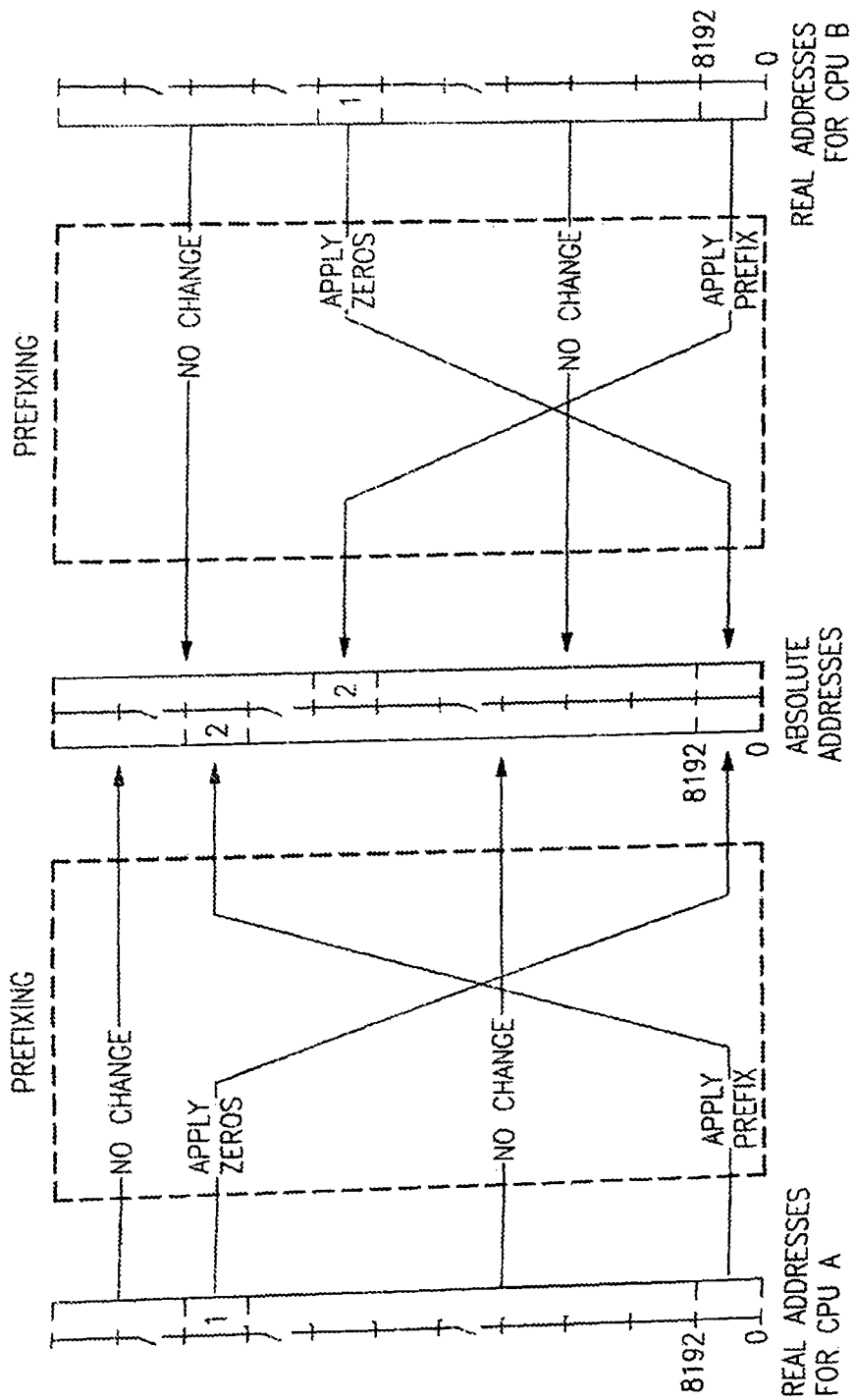
FIG. 12 illustrates the relationship between real and absolute addresses.

The relationship between real and absolute addresses is graphically depicted in (1) and (2) in FIG. 12, wherein:

(1) Real addresses in which bits 0-50 are equal to bits 0-50 of the prefix for this CPU (A or B)

(2) Absolute addresses of the block that contains for this CPU (A or B) the real locations 0-8191.

Address Spaces

An address space is a consecutive sequence of integer numbers (virtual addresses); together with the specific transformation parameters which allow each number to be associated with a byte location in storage. The sequence starts at zero and proceeds left to right.

When a virtual address is used by a CPU to access main storage, it is first converted, by means of dynamic address translation (DAT), to a real or absolute address. A real address may be further subjected to prefixing to form an absolute address. DAT may use a region first table, region second table, region third table, segment table, and a page table as transformation parameters. The designation (origin and length) of the highest level table for a specific address space is called an Address Space Control Element (ASCE), and it is found for use by DAT in a control register or as specified by an access register. Alternatively, the ASCE for an address space may be a real space designation, which indicates that DAT is to translate the virtual address simply by treating it as a real address and without using any tables.

DAT uses, at different times, the ASCE in different control registers or specified by the access registers. The choice is determined by the translation mode specified in the current program status word. Four translation modes are available: primary space mode, secondary space mode, access register mode, and home space mode. Different address spaces are addressable depending on the translation mode.

At any instant when the CPU is in the primary space mode or secondary space mode, the CPU can translate virtual addresses belonging to two address spaces—the primary address space and the secondary address space. At any instant when the CPU is in the access register mode, it can translate virtual addresses of up to 16 address spaces—the primary address space and up to 15 AR specified address spaces. At any instant when the CPU is in the home space mode, it can translate virtual addresses of the home address space.

The primary address space is identified as such because it consists of primary virtual addresses, which are translated by means of the Primary Address Space Control Element (PASCE). Similarly, the secondary address space consists of secondary virtual addresses translated by means of the Secondary Address Space Control Element (SASCE). The AR specified address spaces consist of AR specified virtual addresses translated by means of Access Register-specified Address Space Control Element (AR specified ASCE), and the home address space consists of home virtual addresses translated by means of the Home Address Space Control Element (HASCE). The primary and secondary ASCEs are in control registers 1 and 7, respectively. The AR specified ASCEs may be in control registers 1 and 7, or in table entries called ASN second table entries. The HASCE is in control register 13.

Dynamic Address Translation

Dynamic address translation is the process of translating a virtual address (during a storage reference, for example) into the corresponding main memory address (real address or absolute address in the embodiment). The virtual address may be a primary virtual address, secondary virtual address, Access Register specified virtual address, or a home virtual address. These addresses are translated by means of the PASCE, SASCE, AR-specified ASCE, or the HASCE, respectively. After selection of the appropriate ASCE, the translation process is the same for all of the four types of virtual address.

Addressing Translation Mode

An effective address is the address (virtual address) which exists before any transformation by dynamic address translation or prefixing is performed. The three bits in the program status word that control dynamic address translation are bit 5, the DAT mode bit, and bits 16 and 17, the address space control bits. When the DAT mode bit is zero, then DAT is off, and the CPU is in the real mode. When the DAT mode bit is one, then DAT is on, and the CPU is in the translation mode designated by the address space control bits: binary 00 designates the primary space mode, binary 01 designates the access register mode, binary 10 designates the secondary space mode, and binary 11 designates the home space mode. The various modes are shown in FIG. 18, along with the handling of addresses in each mode.

Translation Modes

The Program Status Word is a 128 bit word which, in part, provides 2 bits which indicate the addressing mode. In one embodiment, bit 31 is the Extended Addressing Mode (EA) bit and bit 32 is the Base Addressing Mode (BA) bit. These two bits indicate the size of addresses. The state of each of these two bits is binary (1 or 0). If the EA bit is 0 and the BA bit is 0 then 24-bit addressing is indicated. If 24-bit addressing is indicated, bits 40-63 of a 64-bit word (a 64-bit entity is commonly called a doubleword) is where the address is located. Where the instruction address occupies the second 64 bits of a 128-bit entity (a quadword), the bit positions in the program status word are as follows. In 24-bit mode, the instruction address is in bits 104-127 of the program status word. In the 31-bit mode, the instruction address is in bits 97-127 of the program status word. In 64-bit mode, the instruction address is in bits 64-127 of the program status word. If the EA bit is 0 and the BA bit is 1 then 31-bit addressing is indicated. The appropriate 64-bit word contains a 31-bit address located at bit positions 33-63. If the EA bit is 1 and the BA bit is 1 then bits 0-63, which is the entire 64-bits, of a 64-bit word contains the address. Otherwise, an exception condition is indicated. Once the addressing mode has been obtained, the ASCE needs to be determined.

Address Space Control Element (ASCE)

Figure 3:
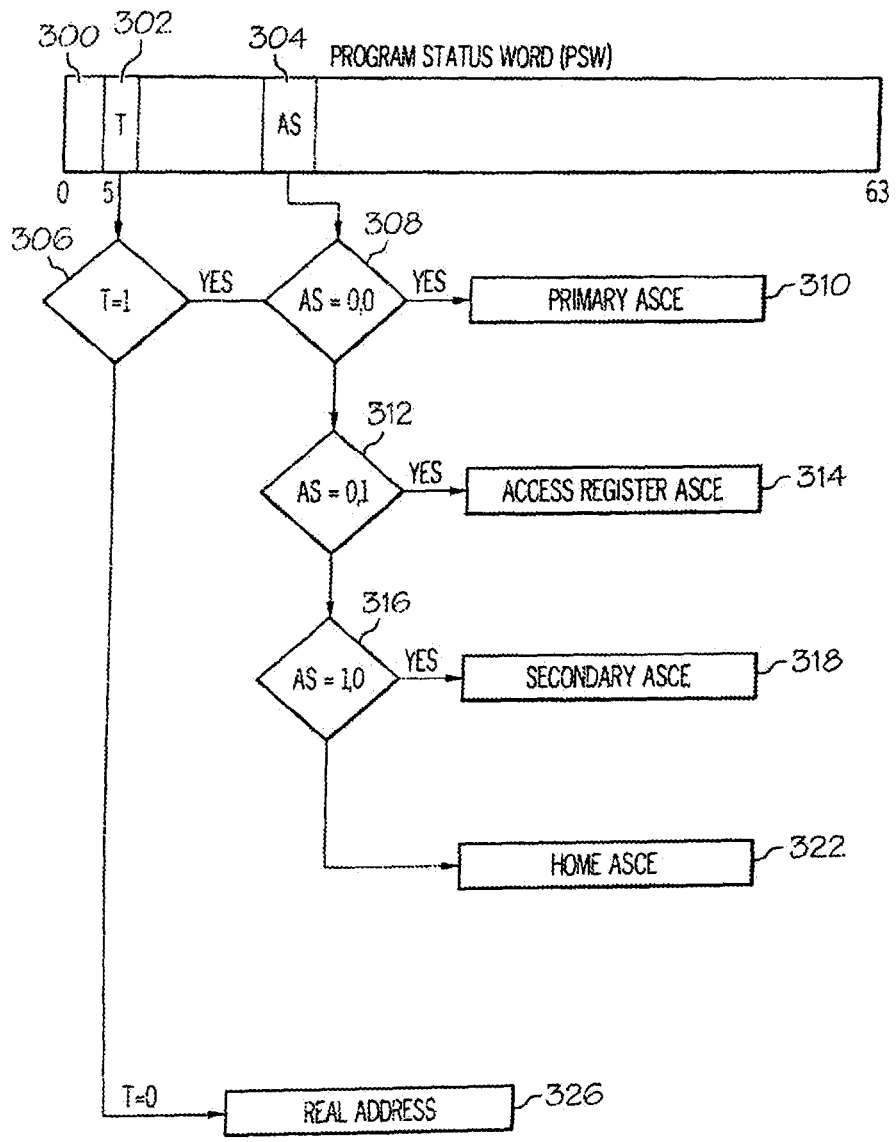
FIG. 3 illustrates one prior art embodiment of how the program status word is used to determine the effective ASCE for dynamic address translation of the virtual address.

Reference is now being made to FIG. 3 which illustrates one embodiment of how the Program Status Word is used to determine the effective Address Space Control Element (ASCE) for dynamic address translation of the virtual address. The ASCE may specify, for example, a 2 Gigabytes (Giga=$2^{30}$) address space. Or, it may specify, for example, 4 Terabytes (Tera=$2^{40}$), 8 Petabytes (Peta=$2^{50}$), or a 16 Exabytes (Exa=$2^{60}$) address space. Or, it may specify a real-space designation. A real space designation causes the virtual address to be treated as a real address in storage without referencing one or more address translation tables.

The Program Status Word 300 contains a translation (T) bit 302 and Address Space (AS) bits 304. At 306, if the translation (T) bit is zero then the address is a real address 326. If, at 308, the Address Space (AS) equals zero (binary 00) then the effective ASCE for this virtual address is the Primary Address Space Control Element (PASCE) 310. If, at 312, the Address Space (AS) equals one (binary 01) then the effective ASCE is the Access Register-specified Address Space Control Element 314. If, at 316, an Address Space (AS) equals two (binary 10) then the effective ASCE is the Secondary Address Space Control Element (SASCE) 318.

Otherwise, the Address Space (AS) equals three (binary 11) and the effective ASCE is the Home Address Space Control Element (HASCE) 322.

After selection of the effective ASCE, the process of dynamic address translation is preferably the same for all four types of virtual addresses.

A segment table designation or region table designation causes translation to be performed by means of tables established by the operating system in real or absolute storage. A real space designation causes the virtual address simply to be treated as a real address, without the use of tables in storage.

In the process of translation when using a segment table designation or a region table designation, three types of units of information are recognized—regions, segments, and pages. A region is a block of sequential virtual addresses spanning 2 Gigabytes and beginning at a 2 Gigabyte boundary. A segment is a block of sequential virtual addresses spanning 1 Megabytes and beginning at a 1 Megabyte boundary. A page is a block of sequential virtual addresses spanning 4 Kilobytes and beginning at a 4 Kilobyte boundary.

Virtual Address Format

Translation of a virtual address may involve referencing a plurality of translation tables of a hierarchy of translation tables to obtain a real or absolute address. The real address may be further subject to a prefixing operation to form an absolute address. The virtual address contains indexes to entries in translation tables in the hierarchy of translation tables. The virtual address, accordingly, is divided into four principal fields. Bits 0-32 are called the region index (RX), bits 33-43 are called the segment index (SX), bits 44-51 are called the page index (PX), and bits 52-63 are called the byte index (BX). In one embodiment, the virtual address has the format shown in FIG. 19.

Format of the Virtual Address

Figure 20:
FIG. 20 depicts one example format of selected bits of the virtual address of FIG. 19.

As determined by its ASCE, a virtual address space may be a 2 Gigabyte space consisting of one region, or it may be up to a 16 Exabyte space consisting of up to 8 Gigabyte regions. The RX part of a virtual address applying to a 2 Gigabyte address space must be all zeros; otherwise, an exception is recognized. The RX part of a virtual address is itself divided into three fields. Bits 0-10 are called the region first index (RFX), bits 11-21 are called the region second index (RSX), and bits 22-32 are called the region third index (RTX). In one embodiment, bits 0-32 of the virtual address have the format shown in FIG. 20.

Format of RX of the Virtual Address

A virtual address in which the RTX is the leftmost significant part (a 42-bit address) is capable of addressing 4 Terabytes (2048 regions), one in which the RSX is the leftmost significant part (a 53-bit address) is capable of addressing 8 Petabytes (4,194,304 regions), and one in which the RFX is the leftmost significant part (a 64-bit address) is capable of addressing 16 Exabytes (8,589,934, 592 regions).

A virtual address in which the RX is zero can be translated into a real address by means of two translation tables: a segment table and a page table. With the EDAT facility enabled, the translation may be completed with only the segment table. The RFX may be non-zero, in which case, a region first table, region second table, and region third table, are required. If the RFX is zero, but the RSX may be non-zero, a region second table and region third table are required. If the RFX and RSX are zero, but the RTX may be non-zero, a region third table is required.

An exception is recognized if the ASCE for an address space does not designate the highest level of table (beginning with the region first table and continuing downward to the segment table) needed to translate a reference to the address space.

Dynamic Translation of the Virtual Address

Figure 4:
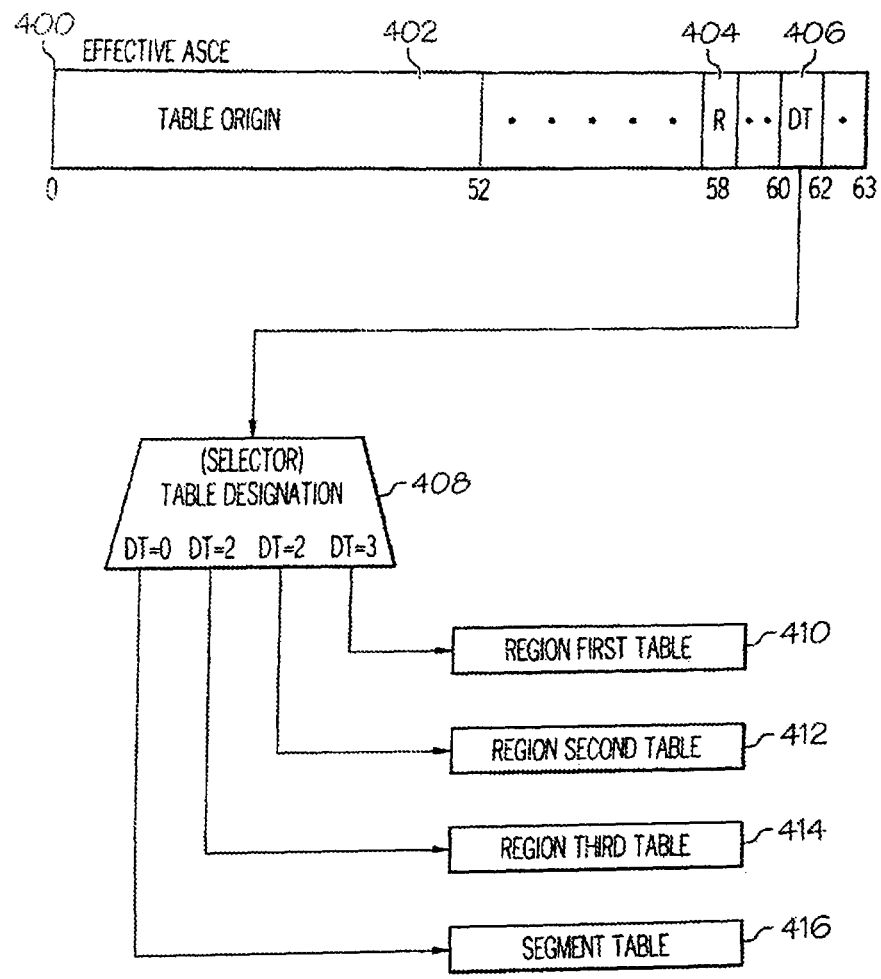
FIG. 4 illustrates one prior art embodiment wherein the effective ASCE determined in FIG. 3 is used to determine the highest translation table in the hierarchy of translation tables used in translation of the virtual address.

Reference is now being made to FIG. 4 illustrating one embodiment wherein the effective ASCE determined in FIG. 3 is used to determine the first translation table in the hierarchy of translation tables used in translation of the virtual address.

In one embodiment, control register 1 (CR1) contains the PASCE. Control register 7 (CR7) contains the SASCE. Control register 13 (CR13) contains the HASCE, and an Address-Space-Second-table Entry (ASTE) that is derived by the Access-Register-Translation (ART) process contains an Access Register-specified Address Space Control Element. An effective ASCE 400 is selected from one of these locations.

A first portion of the effective ASCE 400 contains a table origin 402 which contains an origin address designating either a region first table, a region second table, a region third table, or a segment table. The table origin (bits 0 . . . 51) is appended with 12 binary zeros to form a 64-bit origin address of the highest translation table in the hierarchy of translation tables to be used in translation of the virtual address. Effective ASCE 400 also contains a real space control (R) bit 404 and DT bits 406. If the real space control (R) bit is zero then the DT bits are decoded by selector 408 to determine which particular origin address is table origin 402. If the DT bits equal three (binary 11) then table origin 402 designates a region first table 410. If the DT bits equal two (binary 10) then table origin 402 designates a region second table 412. If the DT bits equal one (binary 01) then table origin 402 designates a region third table 414. Otherwise, if the DT bits equal zero (binary 00) then table origin 402 designates a segment table 416.

A region first table, region second table, or region third table is sometimes referred to simply as a region table. Similarly, a region first table designation, region second table designation, or region third table designation is sometimes referred to as a region table designation. The region, segment, and page tables reflect the current assignment of real storage. Page is a term used for the assignment of virtual storage. Real storage is allotted in fixed blocks. Pages need not be adjacent in real storage even though assigned to a set of sequential virtual addresses.

When the ASCE used in a translation is a region first table designation, the translation process consists in a multi-level lookup using, for example, a region first table, a region second table, a region third table, a segment table, and optionally a page table. These tables reside in real or absolute storage. When the ASCE is a region second table designation, region third table designation, or segment table designation, the lookups in the levels of tables above the designated level are omitted, and the higher level tables themselves are omitted.

Figure 5A:
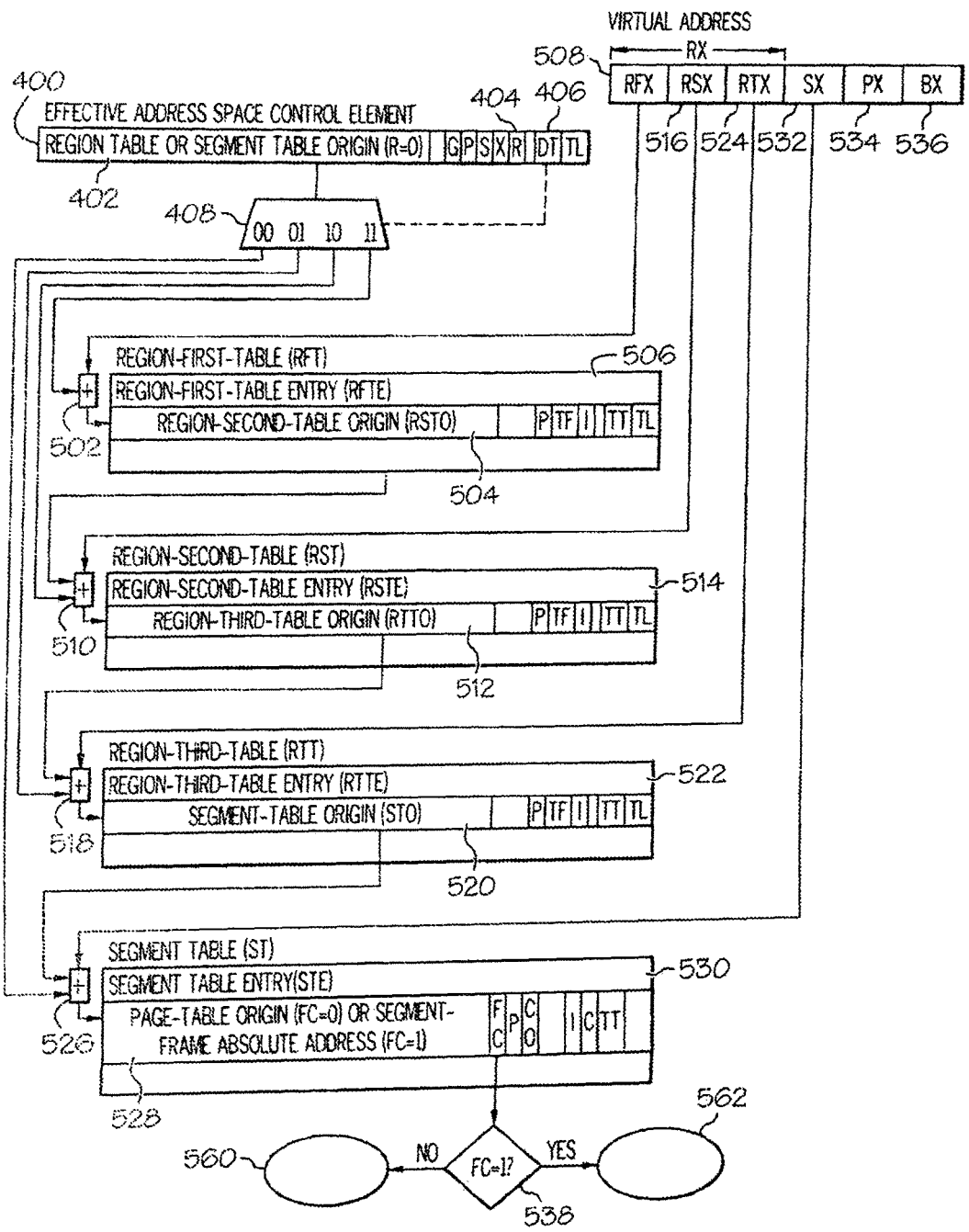
FIG. 5A illustrates one embodiment of the process of dynamic address translation of a virtual address using a hierarchy of translation tables to the segment table level.

Reference is now being made to FIG. 5A illustrating one embodiment of dynamic address translation of a virtual address using a hierarchy of translation tables.

The effective ASCE 400 of FIG. 4 contains the Designation Type (DT) bits 406. If the real space control (R) 404 bit of the ASCE is zero then the DT bits are decoded by selector 408 to determine which origin address table origin 402 designates. If the real space control (R) bit is one then dynamic address translation takes place as shown at node D 564 in FIG. 5B.

If the DT bits equal three (binary 11) in selector 408 then the designated first table in the hierarchy of translation tables is a region first table. Table origin 402 is arithmetically added, at 502, with a Region First Index (RFX) 508 portion of the virtual address to reference region first table entry 506 in a region first table. The table origin (either with 12 zeros appended on the right, or multiplied by 4096) is added to the product of the index multiplied by 8 (or the index with three zeros appended on the right). The region first table entry contains a region second table origin 504 to a next lower table in the hierarchy of translation tables used in translation. The next lower table to the region first table is the region second table. If the invalid (I) bit of the region first table entry is equal to one then the region first table entry is invalid and cannot be used in translation. An exception condition is indicated.

If the DT bits equal two (binary 10) in selector 408 then the designated first table in the hierarchy of translation tables is a region second table. Table origin 402 is arithmetically added, at 510, with a Region Second Index (RSX) 516 portion of the virtual address to reference region second table entry 514 in a region second table. The table origin (either with 12 zeros appended on the right, or multiplied by 4096) is added to the product of the index multiplied by 8 (or the index with three zeros appended on the right). The region second table entry contains a region third table origin 512 to a next lower table in the hierarchy of translation tables used in translation. The next lower table to the region second table is the region third table. If the invalid (I) bit of the region second table entry is equal to one then the region second table entry is invalid and an exception condition is indicated.

If the DT bits equal one (binary (01) in selector 408 then the designated first table in the hierarchy of translation tables is a region third table. Table origin 402 is arithmetically added, at 518, with a Region Third Index (RTX) 524 portion of the virtual address to reference region third table entry 522 in a region third table. The table origin (either with 12 zeros appended on the right, or multiplied by 4096) is added to the product of the index multiplied by 8 (or the index with three zeros appended on the right). The region third table entry contains a segment table origin 520 to a next lower table in the hierarchy of translation tables used in translation. The next lower table to the region third table is the segment table. If the invalid (I) bit of the region third table entry is equal to one then the region third table entry is invalid and an exception condition is indicated.

If the DT bits equal zero (binary (00) in selector 408 then the designated first table in the hierarchy of translation tables is a segment table. Table origin 402 is arithmetically added, at 526, with a Segment Index (SX) 532 portion of the virtual address to reference segment table entry 530 in a segment table. The table origin (either with 12 zeros appended on the right, or multiplied by 4096) is added to the product of the index multiplied by 8 (or the index with three zeros appended on the right). The segment table entry contains either an origin address to a page table or a segment frame absolute address (SFAA), either shown at 528. If the invalid (I) bit of the segment table entry is equal to one then the segment table entry is invalid and an exception condition is indicated.

At 538, the STE format control (FC) bit of the segment table is examined. If the STE format control is one then the segment table entry 530 contains a segment frame absolute address (SFAA) 552 and dynamic address translation continues with reference to node 562 in FIG. 5C. Otherwise, the segment table entry obtained form the segment table contains a page table origin address and dynamic address translation continues with reference to node 560 in FIG. 5B.

Figure 5B:
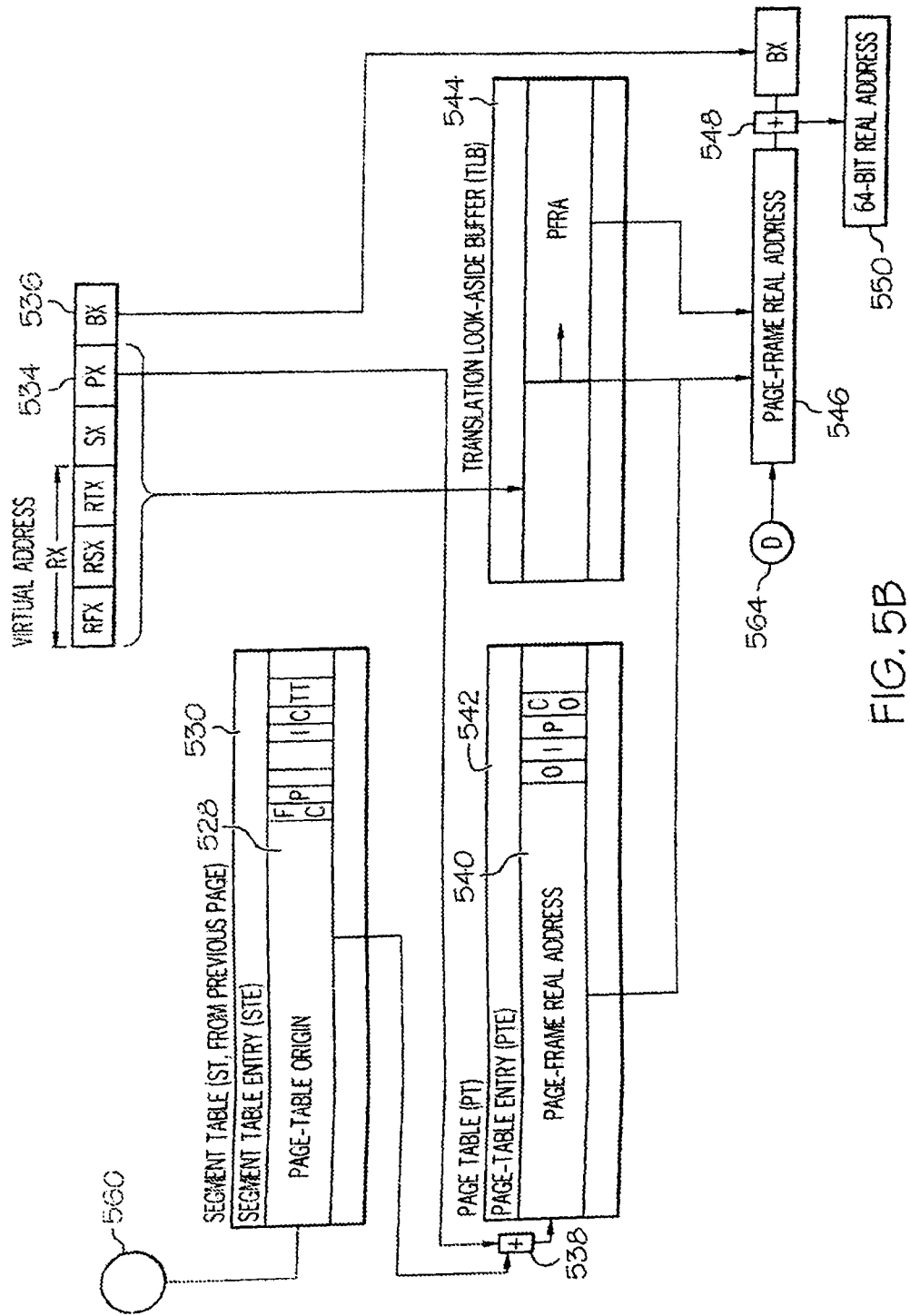
FIG. 5B illustrates a continuation of the dynamic address translation of FIG. 5A wherein the Segment Table Entry (STE) format control (FC) is zero.

With reference now being made to FIG. 5B. If the STE format control in the segment table entry is zero then the segment table entry obtained from the segment table contains an origin address to the next lower table in the hierarchy of translation tables. The next lower table to the segment table is a page table. The page table origin 528, obtained from segment table entry 530 of FIG. 5A, is arithmetically added, at 538, with a Page Index (PX) 534 portion of the virtual address to reference page table entry 542 in a page table. The table origin (either with 11 zeros appended on the right, or multiplied by 2048) is added to the product of the index multiplied by 8 (or the index with three zeros appended on the right). The page table entry contains a page frame real address (PFRA) 546. When the leftmost bits of the page frame real address are concatenated, at 548, with a byte index (BX) 536 portion of the virtual address, a 64-bit real address 550 is obtained. The real 64-bit address may be further subjected to a prefixing operation to form an absolute address. The translated virtual address references a desired 4 Kilobyte (4096 bytes) block of data in main storage or memory.

Preferably, information used in dynamic translation of a virtual address to a memory address is stored in a translation lookaside buffer entry tag along with the address of the block of memory associated with the virtual address. Subsequent storage access can quickly translate a virtual address by comparing ASCE information and virtual address information with translation lookaside buffer tags. If a tag is found to be that of the virtual address, the translation lookaside buffer address of the block of memory can be used instead of performing the slow sequential access of each translation table involved. In one embodiment, the page frame real address (PFRA) along with a tag consisting of, for example, the ASCE and the RX, SX, and PX portions of the virtual address are stored in an entry of the translation lookaside buffer 544. Subsequent translation of this virtual address is thereafter derived from the information stored in the translation lookaside buffer.

Figure 5C:
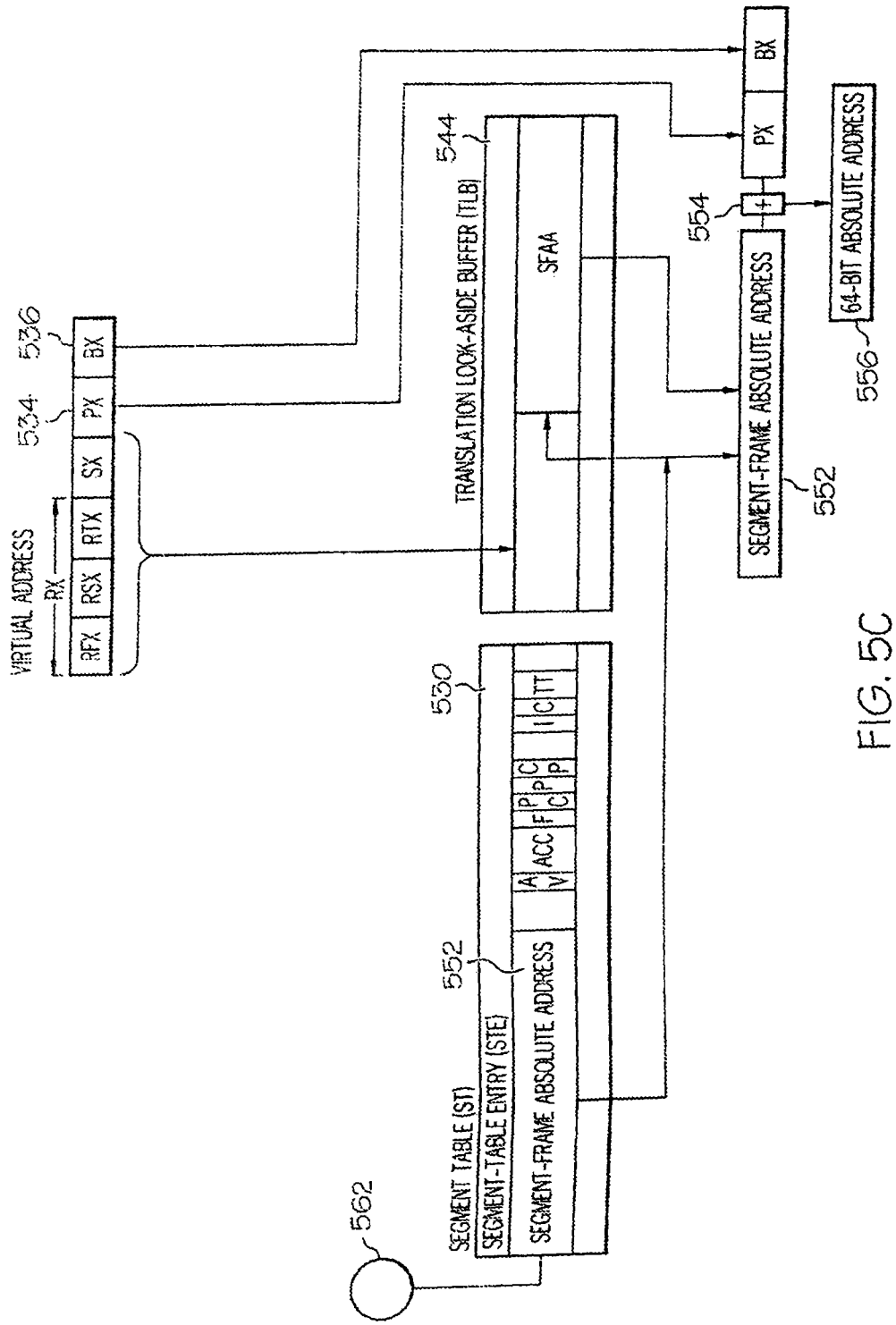
FIG. 5C illustrates a continuation of the dynamic address translation of FIG. 5A wherein the Segment Table Entry (STE) format control (FC) is one.

With reference now being made to FIG. 5C. If the STE format control in the segment table entry 530 is one then the segment table entry contains a segment frame absolute address (SFAA) 552. When the leftmost bits of the segment frame absolute address are concatenated, at 554, with a page index 534 portion and a byte index 536 portion of the virtual address, a 64-bit absolute address 556 is obtained. The translated virtual address references a desired large block of data in main storage or memory. The large block of data is at least 1 megabyte (1,048,576 bytes) in size.

In one embodiment, the segment frame absolute address (SFAA) along with the RX and SX portions of the virtual address are stored in a translation lookaside buffer 544. Subsequent translation of this virtual address is thereafter derived from the information stored in the translation lookaside buffer.

Translation Table Entry Formats

Embodiments of the various translation table entries in the hierarchy of translation tables used in translation are as follows.

Region Table Entries

The term "region table entry" means a region first table entry, region second table entry, or region third table entry. The entries fetched from the region first table, region second table, and region third table have the following formats. The level (first, second, or third) of the table containing an entry is identified by the table type (TT) bits in the entry.

Figure 21A:
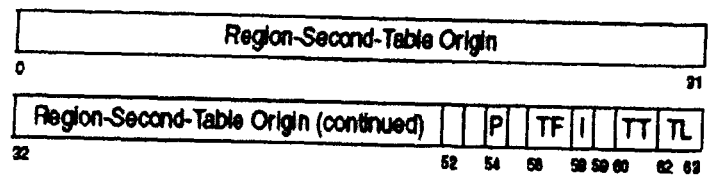
FIGS. 21A-21C depict example formats of a region first table entry, region second table entry and region third table entry, respectively.
Figure 21B:
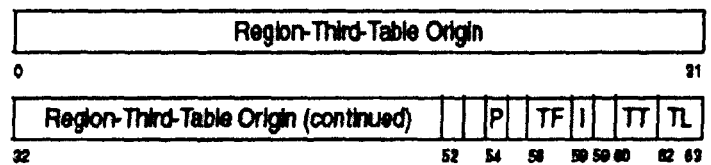
Figure 21C:
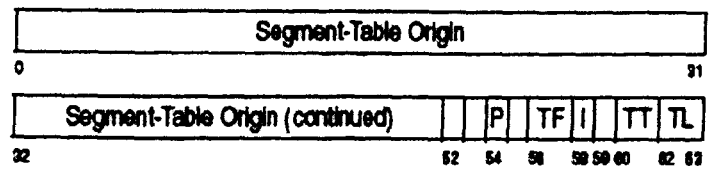

In one embodiment, the formats of the region first table entry, the region second table entry, and the region third table entry are as shown in FIGS. 21A-21C.

Region Second Table Origin, Region Third Table Origin, and Segment Table Origin:

A region first table entry contains a region second table origin. A region second table entry contains a region third table origin. A region third table entry contains a segment table origin. The following description applies to each of the three table origins. Bits 0-51 of the entry, with 12 zeros appended on the right, form a 64-bit address that designates the beginning of the next lower level table.

DAT Protection Bit (P):

When enhanced DAT applies, bit 54 is treated as being OR'ed with the DAT protection bit in each subsequent region table entry, segment table entry, and, when applicable, page table entry used in the translation. Thus, when the bit is one, DAT protection applies to the entire region or regions specified by the region table entry. When the enhanced DAT facility is not installed, or when the facility is installed but the enhanced DAT enablement control is zero, bit 54 of the region table entry is ignored.

Region Second Table Offset, Region Third Table Offset, and Segment Table Offset (TF):

A region first table entry contains a region second table offset. A region second table entry contains a region third table offset. A region third table entry contains a segment table offset. The following description applies to each of the three table offsets. Bits 56 and 57 of the entry specify the length of a portion of the next lower level table that is missing at the beginning of the table, that is, the bits specify the location of the first entry actually existing in the next lower level table. The bits specify the length of the missing portion in units of 4,096 bytes, thus making the length of the missing portion variable in multiples of 512 entries. The length of the missing portion, in units of 4,096 bytes, is equal to the TF value. The contents of the offset field, in conjunction with the length field, bits 62 and 63, are used to establish whether the portion of the virtual address (RSX, RTX, or SX) to be translated by means of the next lower level table designates an entry that actually exists in the table.

Region Invalid Bit (I):

Bit 58 in a region first table entry or region second table entry controls whether the set of regions associated with the entry is available. Bit 58 in a region third table entry controls whether the single region associated with the entry is available. When bit 58 is zero, address translation proceeds by using the region table entry. When the bit is one, the entry cannot be used for translation.

Table Type Bits (TT):

Bits 60 and 61 of the region first table entry, region second table entry, and region third table entry identify the level of the table containing the entry, as follows: Bits 60 and 61 must identify the correct table level, considering the type of table designation that is the ASCE being used in the translation and the number of table levels that have so far been used; otherwise, a translation specification exception is recognized. The table shown in FIG. 21D depicts example table type bits.

Table Type bits for region table Entries

Region Second Table Length, Region Third Table Length, and Segment Table Length (TL):

A region first table entry contains a region second table length. A region second table entry contains a region third table length. A region third table entry contains a segment table length. The following description applies to each of the three table lengths. Bits 62 and 63 of the entry specify the length of the next lower level table in units of 4,096 bytes, thus making the length of the table variable in multiples of 512 entries. The length of the next lower level table, in units of 4,096 bytes, is one more than the TL value. The contents of the length field, in conjunction with the offset field, bits 56 and 57, are used to establish whether the portion of the virtual address (RSX, RTX, or SX) to be translated by means of the next lower level table designates an entry that actually exists in the table. All other bit positions of the region table entry are reserved for possible future extensions and should contain zeros; otherwise, the program may not operate compatibly in the future. When enhanced DAT applies, the reserved bit positions of the region table entry should contain zeros even if the table entry is invalid.

Segment Table Entries

When enhanced DAT does not apply, or when enhanced DAT applies and the STE format control, bit 53 of the segment table entry is zero, the entry fetched from the segment table, in one embodiment, has the format shown in FIG. 22A.

When enhanced DAT applies and the STE format control is one, the entry fetched from the segment table, in one embodiment, has the format shown in FIG. 22B.

Format II of a Segment Table Entry

Selected fields in the segment table entry are allocated as follows:

Page Table Origin:

When enhanced DAT does not apply, or when enhanced DAT applies but the STE format control, bit 53 of the segment table entry, is zero, bits 0-52, with 11 zeros appended on the right, form a 64-bit address that designates the beginning of a page table. It is unpredictable whether the address is real or absolute.

Segment Frame Absolute Address (SFAA):

When enhanced DAT applies and the STE format control is one, bits 0-43 of the entry, with 20 zeros appended on the right, form the 64-bit absolute address of the segment.

ACCF Validity Control (AV):

When enhanced DAT applies and the STE format control is one, bit 47 is the access control bits and fetch protection bit (ACCF) validity control. When the AV control is zero, bits 48-52 of the segment table entry are ignored. When the AV control is one, bits 48-52 are used as described below.

Access Control Bits (ACC):

When enhanced DAT applies, the STE format control is one, and the AV control is one, bits 48-51 of the segment table entry contain the access control bits that may be used for any key controlled access checking that applies to the address.

Fetch Protection Bit (F):

When enhanced DAT applies, the STE format control is one, and the AV control is one, bit 52 of the segment table entry contains the fetch protection bit that may be used for any key controlled access checking that applies to the address.

STE Format Control (FC):

When enhanced DAT applies, bit 53 is the format control for the segment table entry, as follows:

When the FC bit is zero, bits 0-52 of the entry form the page table origin, and bit 55 is reserved.

When the FC bit is one, bits 0-43 of the entry form the segment frame absolute address, bit 47 is the ACCF validity control, bits 48-51 are the access control bits, bit 52 is the fetch protection bit, and bit 55 is the change recording override. When enhanced DAT does not apply, bit 53 is ignored.

DAT Protection Bit (P):

Bit 54, when one, indicates that DAT protection applies to the entire segment.

When enhanced DAT does not apply, bit 54 is treated as being OR'ed with the DAT protection bit in the page table entry used in the translation.

When enhanced DAT applies, the DAT protection bit in any and all region table entries used in the translation are treated as being OR'ed with the DAT protection bit in the segment table entry; when the STE format control is zero, the DAT protection bit in the STE is further treated as being OR'ed with the DAT protection bit in the page table entry.

Change Recording Override (CO):

When enhanced DAT applies, and the STE format control is one, bit 55 of the segment table entry is the change recording override for the segment. When enhanced DAT does not apply, or when enhanced DAT applies but the STE format control is zero, bit 55 of the segment table entry is ignored.

Segment Invalid Bit (I):

Bit 58 controls whether the segment associated with the segment table entry is available.

When the bit is zero, address translation proceeds by using the segment table entry.

When the bit is one, the segment table entry cannot be used for translation.

Common Segment Bit (C):

Bit 59 controls the use of the translation lookaside buffer copies of the segment table entry. When enhanced DAT does not apply or when enhanced DAT applies but the format control is zero, bit 59 also controls the use of the translation lookaside buffer copies of the page table designated by the segment table entry.

A zero identifies a private segment; in this case, the segment table entry and any page table it designates may be used only in association with the segment table origin that designates the segment table in which the segment table entry resides.

A one identifies a common segment; in this case, the segment table entry and any page table it designates may continue to be used for translating addresses corresponding to the segment index, even though a different segment table is specified.

However, translation lookaside buffer copies of the segment table entry and any page table for a common segment are not usable if the private space control, bit 55, is one in the ASCE used in the translation or if that ASCE is a real space designation. The common segment bit must be zero if the segment table entry is fetched from storage during a translation when the private space control is one in the ASCE being used. Otherwise, a translation specification exception is recognized.

Figures 23, 24, 25:
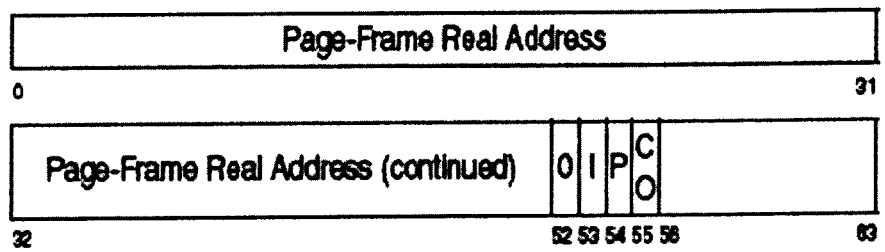
FIG. 23 depicts example table levels.
FIG. 24 depicts one example format of apage table entry.
FIG. 25 depicts example designation types.

Table Type Bits (TT):

Bits 60 and 61 of the segment table entry are 00 binary to identify the level of the table containing the entry. The meanings of all possible values of bits 60 and 61 in a region table entry or segment table entry are as shown in FIG. 23.

Table Type Bits 60, 61

Bits 60 and 61 must identify the correct table level, considering the type of table designation that is the ASCE being used in the translation and the number of table levels that have so far been used; otherwise, a translation specification exception is recognized. All other bit positions of the segment table entry are reserved for possible future extensions and should contain zeros; otherwise, the program may not operate compatibly in the future. When enhanced DAT applies, the reserved bit positions of the segment table entry should contain zeros even if the table entry is invalid.

Page Table Entries

In one embodiment, the entry fetched from the page table has the format shown in FIG. 24.

Format of a Page Table Entry

Selected fields in the page table entry are allocated as follows:

Page Frame Real Address (PFRA):

Bits 0-51 provide the leftmost bits of a real storage address. When these bits are concatenated with the 12-bit byte index field of the virtual address on the right, a 64-bit real address is obtained.

Page Invalid Bit (I):

Bit 53 controls whether the page associated with the page table entry is available. When the bit is zero, address translation proceeds by using the page table entry. When the bit is one, the page table entry cannot be used for translation.

DAT Protection Bit (P):

Bit 54 controls whether store accesses can be made in the page. This protection mechanism is in addition to the key controlled protection and low address protection mechanisms. The bit has no effect on fetch accesses. If the bit is zero, stores are permitted to the page, subject to the following additional constraints:

The DAT protection bit being zero in the segment table entry used in the translation.

When enhanced DAT applies, the DAT protection bit being zero in all region table entries used in the translation.

Other protection mechanisms.

If the bit is one, stores are disallowed. When no higher priority exception conditions exist, an attempt to store when the DAT protection bit is one causes a protection exception to be recognized. The DAT protection bit in the segment table entry is treated as being OR'ed with bit 54 when determining whether DAT protection applies to the page. When enhanced DAT applies, the DAT protection bit in any region table entries used in translation are also treated as being OR'ed with bit 54 when determining whether DAT protection applies.

Change Recording Override (CO):

When enhanced DAT does not apply, bit 55 of the page table entry must contain zero; otherwise, a translation specification exception is recognized as part of the execution of an instruction using that entry for address translation. When enhanced DAT applies and the STE format control is zero, bit 55 of the page table entry is the change recording override for the page.

Bit position 52 of the entry must contain zero; otherwise, a translation specification exception is recognized as part of the execution of an instruction using that entry for address translation. Bit positions 56-63 are not assigned and are ignored.

Another Embodiment of the Dynamic Translation

This section describes the translation process as it is performed implicitly before a virtual address is used to access main storage.

Translation of a virtual address is controlled by the DAT mode bit and address space control bits in the program status word and by the ASCEs in control registers 1, 7, and 13 and as specified by the access registers. When the ASCE used in a translation is a region first table designation, the translation is performed by means of a region first table, region second table, region third table, segment table, and page table, all of which reside in real or absolute storage. When the ASCE is a lower level type of table designation (region second table designation, region third table designation, or segment table designation) the translation is performed by means of only the table levels beginning with the designated level, and the virtual address bits that would, if non-zero, require use of a higher level or levels of table must be all zeros; otherwise, an ASCE-type exception is recognized. When the ASCE is a real space designation, the virtual address is treated as a real address, and table entries in real or absolute storage are not used.

The ASCE used for a particular address translation is called the effective ASCE. Accordingly, when a primary virtual address is translated, the contents of control register 1 are used as the effective ASCE. Similarly, for a secondary virtual address, the contents of control register 7 are used; for an AR specified virtual address, the ASCE specified by the access register is used; and for a home virtual address, the contents of control register 13 are used.

When the real space control in the effective ASCE is zero, the designation type in the ASCE specifies the table designation type: region first table, region second table, region third table, or segment table. The corresponding portion of the virtual address (region first index, region second index, region third index, or segment index) is checked against the table length field in the designation, and it is added to the origin in the designation to select an entry in the designated table. If the selected entry is outside its table, as determined by the table length field in the designation, or if the I bit is one in the selected entry, a region first translation, region second translation, region third translation, or segment translation exception is recognized, depending on the table level specified by the designation. If the table type bits in the selected entry do not indicate the expected table level, a translation specification exception is recognized.

The table entry selected by means of the effective ASCE designates the next lower level table to be used. If the current table is a region first table, region second table, or region third table, the next portion of the virtual address (region second index, region third index, or segment index, respectively) is checked against the table offset and table length fields in the current table entry, and it is added to the origin in the entry to select an entry in the next lower level table. If the selected entry in the next table is outside its table, as determined by the table offset and table length fields in the current table entry, or if the I bit is one in the selected entry, a region second translation, region third translation, or segment translation exception is recognized, depending on the level of the next table. If the table type bits in the selected entry do not indicate the expected table level, a translation specification exception is recognized.

Processing of portions of the virtual address by means of successive table levels continues until a segment table entry has been selected. The segment table entry contains a page protection bit that applies to all pages in the specified segment.

The page index portion of the virtual address is added to the page table origin in the segment table entry to select an entry in the page table. If the I bit is one in the page table entry, a page translation exception is recognized. The page table entry contains the leftmost bits of the real address that represents the translation of the virtual address, and it contains a page protection bit that applies only to the page specified by the page table entry.

The byte index field of the virtual address is used unchanged as the rightmost bit positions of the real address.

In order to eliminate the delay associated with references to translation tables in real or absolute storage, the information fetched from the tables normally is also placed in a special buffer, the translation lookaside buffer, and subsequent translations involving the same table entries may be performed by using the information recorded in the translation lookaside buffer. The translation lookaside buffer may also record virtual equals real translations related to a real space designation.

Whenever access to real or absolute storage is made during the address translation process for the purpose of fetching an entry from a region table, segment table, or page table, key controlled protection does not apply.

Lookup in a Table Designated by an ASCE

The DT control, bits 60-61 of the effective ASCE, specifies both the table designation type of the ASCE and the portion of the virtual address that is to be translated by means of the designated table, as shown in FIG. 25.

Translation by Means of Designated Table

When bits 60 and 61 have the value 11 binary, the region first index portion of the virtual address, in conjunction with the region first table origin contained in the ASCE, is used to select an entry from the region first table. The 64-bit address of the region first table entry in real or absolute storage is obtained by appending 12 zeros to the right of bits 0-51 of the region first table designation and adding the region first index with three rightmost and 50 leftmost zeros appended. As part of the region first table lookup process, bits 0 and 1 of the virtual address (which are bits 0 and 1 of the region first index) are compared against the table length, bits 62 and 63 of the region first table designation, to establish whether the addressed entry is within the region first table. If the value in the table length field is less than the value in the corresponding bit positions of the virtual address, a region first translation exception is recognized. The comparison against the table length may be omitted if the equivalent of a region first table entry in the translation lookaside buffer is used in the translation. The entry fetched from the region first table designates the beginning and specifies the offset and length of the corresponding region second table.

When bits 60 and 61 of the ASCE have the value 10 binary, the region second index portion of the virtual address, in conjunction with the region second table origin contained in the ASCE, is used to select an entry from the region second table. Bits 11 and 12 of the virtual address (which are bits 0 and 1 of the region second index) are compared against the table length in the ASCE. If the value in the table length field is less than the value in the corresponding bit positions of the virtual address, a region second translation exception is recognized. The comparison against the table length may be omitted if the equivalent of a region second table entry in the translation lookaside buffer is used in the translation. The region second table lookup process is otherwise the same as the region first table lookup process; the entry fetched from the region second table designates the beginning and specifies the offset and length of the corresponding region third table.

When bits 60 and 61 of the ASCE have the value 01 binary, the region third index portion of the virtual address, in conjunction with the region third table origin contained in the ASCE, is used to select an entry from the region third table. Bits 22 and 23 of the virtual address (which are bits 0 and 1 of the region third index) are compared against the table length in the ASCE. If the value in the table length field is less than the value in the corresponding bit positions of the virtual address, a region third translation exception is recognized. The region third table lookup process is otherwise the same as the region first table lookup process, including the checking of the table type bits in the region third table entry. The entry fetched from the region third table designates the beginning and specifies the offset and length of the corresponding segment table.

When bits 60 and 61 of the ASCE have the value 00 binary, the segment index portion of the virtual address, in conjunction with the segment table origin contained in the ASCE, is used to select an entry from the segment table. Bits 33 and 34 of the virtual address (which are bits 0 and 1 of the segment index) are compared against the table length in the ASCE. If the value in the table length field is less than the value in the corresponding bit positions of the virtual address, a segment translation exception is recognized. The comparison against the table length may be omitted if the equivalent of a segment table entry in the translation lookaside buffer is used in the translation. The segment table lookup process is otherwise the same as the region first table lookup process, including the checking of the table type bits in the segment table entry. Processing is as follows:

When enhanced DAT does not apply, or when enhanced DAT applies but the STE format control is zero, the entry fetched from the segment table designates the beginning of the corresponding page table, and processing continues as described in "Page Table Lookup", below.

When enhanced DAT applies and the STE format control is one, the entry fetched from the segment table contains the leftmost bits of the segment frame absolute address. If the DAT protection bit is one either in any region table entry used in the translation or in the segment table entry, and the storage reference for which the translation is being performed is a store, a protection exception is recognized.

Lookup in a Table Designated by a Region Table Entry

When the effective ASCE is a region table designation, a region table entry is selected as described in the preceding section. Then the contents of the selected entry and the next index portion of the virtual address are used to select an entry in the next lower level table, which may be another region table or a segment table. When the table entry selected by means of the ASCE is a region first table entry, the region second index portion of the virtual address, in conjunction with the region second table origin contained in the region first table entry, is used to select an entry from the region second table. The 64-bit address of the region second table entry in real or absolute storage is obtained by appending 12 zeros to the right of bits 0-51 of the region first table entry and adding the region second index with three rightmost and 50 leftmost zeros appended.

When forming the address of a region second, region third, or segment table entry, it is unpredictable whether prefixing, if any, is applied to the respective table origin contained in the higher level table entry before the addition of the table index value, or prefixing is applied to the table entry address that is formed by the addition of the table origin and table index value.

As part of the region second table lookup process, bits 11 and 12 of the virtual address (which are bits 0 and 1 of the region second index) are compared against the table offset, bits 56 and 57 of the region first table entry, and against the table length, bits 62 and 63 of the region first table entry, to establish whether the addressed entry is within the region second table. If the value in the table offset field is greater than the value in the corresponding bit positions of the virtual address, or if the value in the table length field is less than the value in the corresponding bit positions of the virtual address, a region second translation exception is recognized.

The region second table designates the beginning and specifies the offset and length of the corresponding region third table.

When the table entry selected by means of the ASCE is a region second table entry, or if a region second table entry has been selected by means of the contents of a region first table entry, the region third index portion of the virtual address, in conjunction with the region third table origin contained in the region second table entry, is used to select an entry from the region third table. Bits 22 and 23 of the virtual address (which are bits 0 and 1 of the region third index) are compared against the table offset and table length in the region second table entry. A region third translation exception is recognized if the table offset is greater than bits 22 and 23 or if the table length is less than bits 22 and 23. The region third table lookup process is otherwise the same as the region second table lookup process. The entry fetched from the region third table designates the beginning and specifies the offset and length of the corresponding segment table.

When the table entry selected by means of the ASCE is a region third table entry, or if a region third table entry has been selected by means of the contents of a region second table entry, the segment index portion of the virtual address, in conjunction with the segment table origin contained in the region third table entry, is used to select an entry from the segment table. Bits 33 and 34 of the virtual address (which are bits 0 and 1 of the segment index) are compared against the table offset and table length in the region third table entry. A segment translation exception is recognized if the table offset is greater than bits 33 and 34 or if the table length is less than bits 33 and 34. A translation specification exception is recognized if (1) the private space control, bit 55, in the ASCE is one and (2) the common segment bit, bit 59, in the entry fetched from the segment table is one. The segment table lookup process is otherwise the same as the region second table lookup process. Processing is as follows:

When enhanced DAT does not apply, or when enhanced DAT applies but the STE format control is zero, the entry fetched from the segment table designates the beginning of the corresponding page table, and processing continues as described in "Page Table Lookup", below.

When enhanced DAT applies and the STE format control is one, the entry fetched from the segment table contains the leftmost bits of the segment frame absolute address. If the DAT protection bit is one either in any region table entry used in the translation or in the segment table entry, and the storage reference for which the translation is being performed is a store, a protection exception is recognized.

Page Table Lookup

When enhanced DAT does not apply, or when enhanced DAT applies but the STE format control is zero, the page index portion of the virtual address, in conjunction with the page table origin contained in the segment table entry, is used to select an entry from the page table.

The 64-bit address of the page table entry in real or absolute storage is obtained by appending 11 zeros to the right of the page table origin and adding the page index, with three rightmost and 53 leftmost zeros appended. A carry out of bit position 0 cannot occur.

The entry fetched from the page table indicates the availability of the page and contains the leftmost bits of the page frame real address. The page invalid bit, bit 53, is inspected to establish whether the corresponding page is available. If this bit is one, a page translation exception is recognized. If bit position 52 contains a one, a translation specification exception is recognized. When enhanced DAT does not apply, or enhanced DAT applies and the STE format control is zero, a translation specification exception is also recognized if bit position 55 contains a one. If the DAT protection bit is one either in the segment table entry used in the translation, in the page table entry, or, when enhanced DAT applies, in any region table entry used during the translation, and the storage reference for which the translation is being performed is a store, a protection exception is recognized.

Formation of the Real and Absolute Addresses

When the effective ASCE is a real space designation, bits 0-63 of the virtual address are used directly as the real storage address. The real address may be further subjected to prefixing to form an absolute address. When the effective ASCE is not a real space designation and no exceptions in the translation process are encountered, the following conditions apply:

When the enhanced DAT does not apply, or when enhanced DAT applies but the STE format control is zero, the page frame real address is obtained from the page table entry. The page frame real address and the byte index portion of the virtual address are concatenated, with the page frame real address forming the leftmost part. The result is the real storage address which corresponds to the virtual address. The real address may be further subjected to prefixing to form an absolute address.

When enhanced DAT applies and the STE format control is one, the segment frame absolute address and the page index and byte index portions of the virtual address are concatenated, left to right, respectively, to form the absolute address which corresponds to the virtual address.

Recognition of Exceptions during Translation

Table entries marked invalid or containing invalid addresses or invalid formats can cause exceptions to be recognized during the translation process. Exceptions are recognized when information contained in table entries is used for translation and is found to be incorrect.

In addition, an exception, for example, an ASCE-type exception. could occur if the virtual address to be translated is beyond the range that can be represented by the top-level table designated by the ASCE. In one example, an ASCE-type exception would occur as a result of the following pseudocode:

```
If ((DT < 3 AND RFX != 0) OR (DT < 2 AND (RFX || RSX) != 0)
OR (DT < 1 AND RX != 0))
then asce_type_exception( );
```

The DT bits are the Designation type (bits 60-61 of the ASCE). The RFX is the Region-First Index (bits 0-10 of the virtual address). The RSX is the Region-Second Index (bits 11-21 of the virtual address). The RX is the entire region index (bits 0-32 of the virtual address). One skilled in this art would readily understand the logical operations and the comparative operands used in the pseudo code.

Translation-Exception Qualifier (TXQ)

With respect to the Translation-Exception Qualifier, it should be understood that the term "when enhanced-DAT applies" pertains to the level (host or guest) at which the translation exception is presented. For example, a TXQ is presented on a host translation exception whenever enhanced DAT applies at the host level, whether or not it applies at the guest level.

During a DAT-related program interruption, a translation exception identification (TEID) is stored. When the enhanced-DAT facility is installed and enabled, a translation exception qualifier (TXQ) is stored in three bits of the TEID. The TXQ assists a host configuration in determining whether the interruption was caused by the host or guest. If the exception was caused by the guest, the TXQ indicates whether or not the interruption was caused by the address contained in a guest leaf table entry and if so, whether the leaf entry was a Segment Table Entry or a Page Table Entry. This allows the host to recognize references to areas the guest views as 4 K-byte versus 1 M-byte frames. The TXQ is designed such that it can be expanded if a larger frame size is needed, e.g., 2 Gigabyte.

During a program interruption due to an ASCE-type, region-first-translation, region-second-translation, region-third-translation, segment-translation, or page-translation exception, bits 0-51 of the virtual address causing the exception are stored in bit positions 0-51 of locations 168-175. This address is sometimes referred to as the translation-exception address. Bits 52-56 of locations 168-175 are unpredictable.

When the enhanced-DAT facility is installed and enabled in the host configuration and a host ASCE-type, region-translation, segment-translation, or page-translation exception is recognized, bits 57-59 contain the translation-exception qualifier (TXQ), as follows:

0—Exception was caused by the currently-executing configuration (that is, a guest DAT exception is presented during guest execution, or a host DAT exception during host execution).

1—Exception was associated with a host virtual address derived from a guest address other than those listed below.

2—Exception was associated with a host virtual address derived from the guest page-frame real address.

3—Exception was associated with a host virtual address derived from the guest segment-frame absolute address.

4-7 Reserved.

TxQ values 1-3 are presented only on host exceptions that occurred during guest execution.

Two-Level DAT

Figure 9:
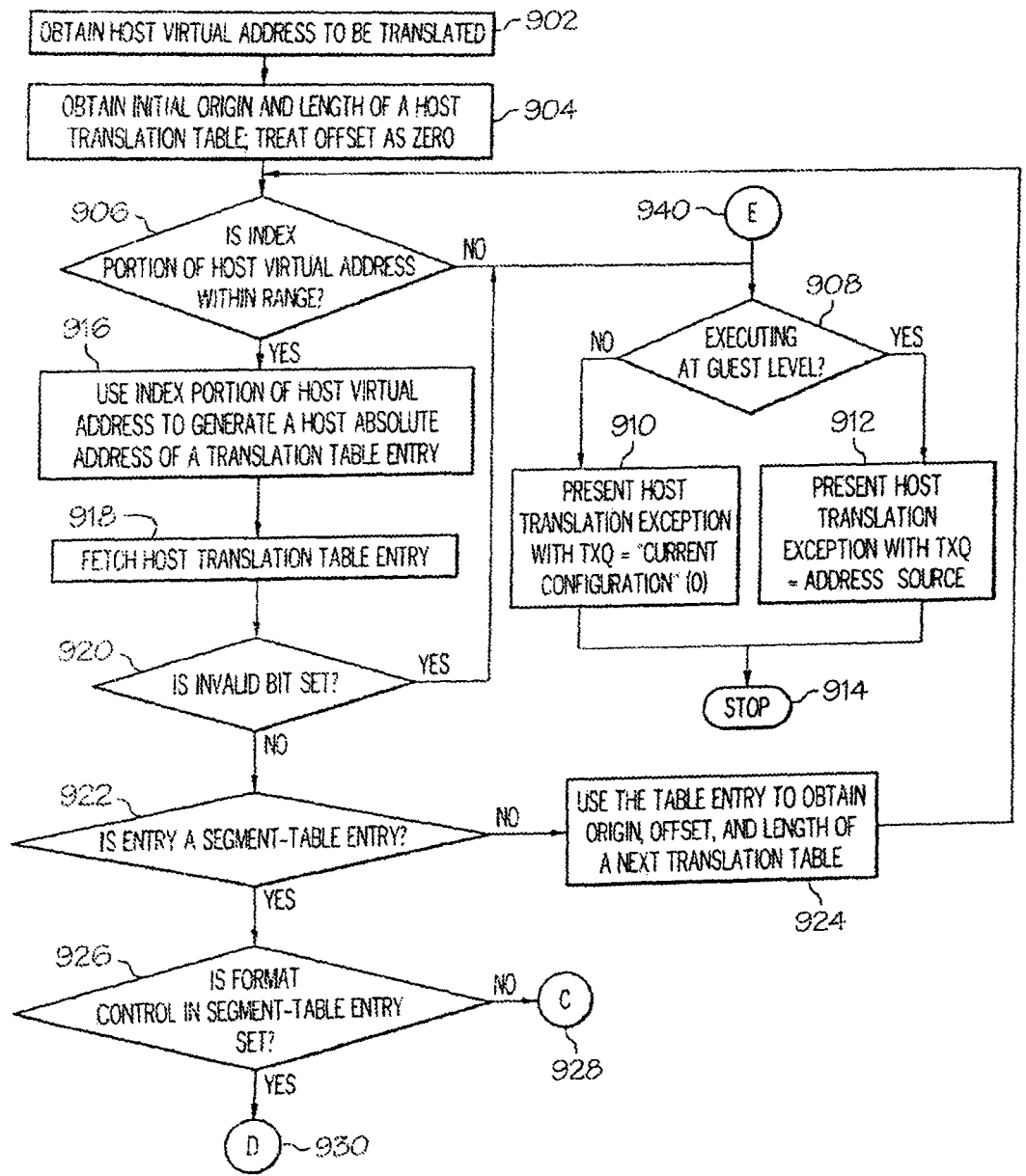
FIG. 9 illustrates a flow diagram of one embodiment of EDAT at the host level, which may be invoked from the guest EDAT process, to obtain a format control field in a host segment table entry.
Figure 10:
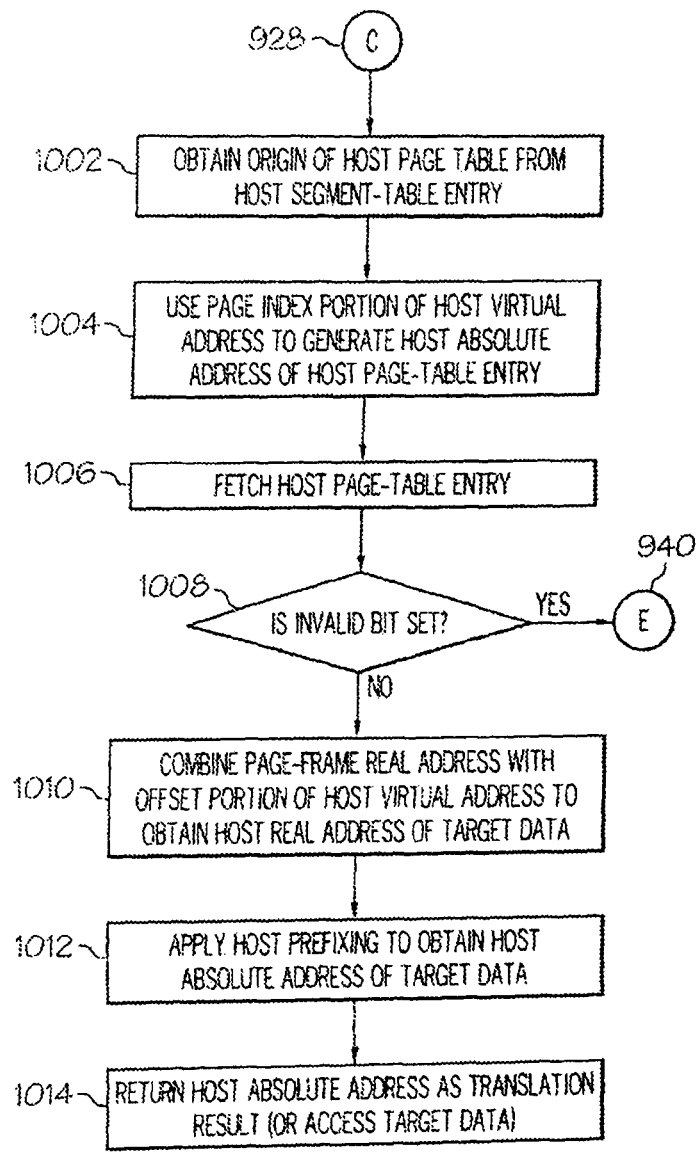
FIG. 10 illustrates a continuation of the flow diagram from node 928 of FIG. 9 when the host STE format control is zero.
Figure 11:
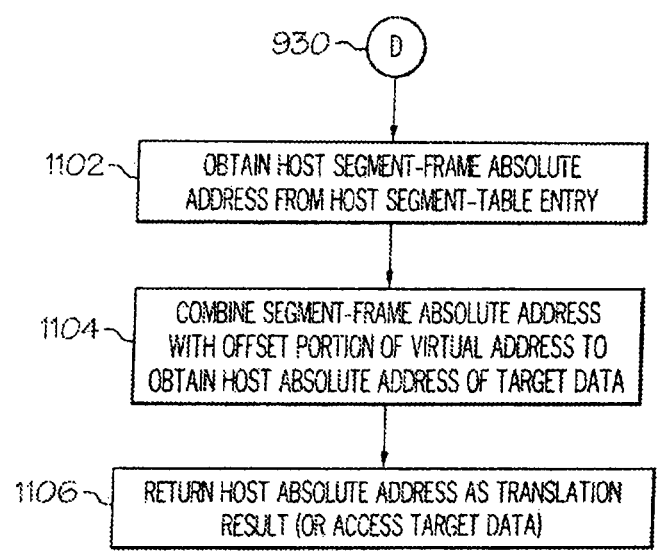
FIG. 11 illustrates a continuation of the flow diagram from node 930 of FIG. 9 when the host STE format control is one.

As explained above, during execution of a pageable guest, two levels of DAT are performed: guest virtual addresses are translated through guest DAT and, when applicable, prefixing to guest absolute addresses, which are then treated as host virtual addresses in the host primary address space, and translated through host DAT and, when applicable, prefixing to host absolute addresses. During the guest DAT process, references are made to guest translation table entries, located via guest absolute addresses which must also be translated through host DAT and, when applicable, prefixing. The process can result in guest DAT exceptions based on guest table specifications and contents, and each reference to a guest absolute address, for a guest table entry or the final target of the guest translation, can give rise to host DAT exceptions. The appropriate TXQ must be generated for each of these exceptions, per the specifications above. FIGS. 6-9 illustrate the guest DAT process in detail, and FIGS. 9-11 illustrate the host DAT process.

Guest DAT

Figure 6:
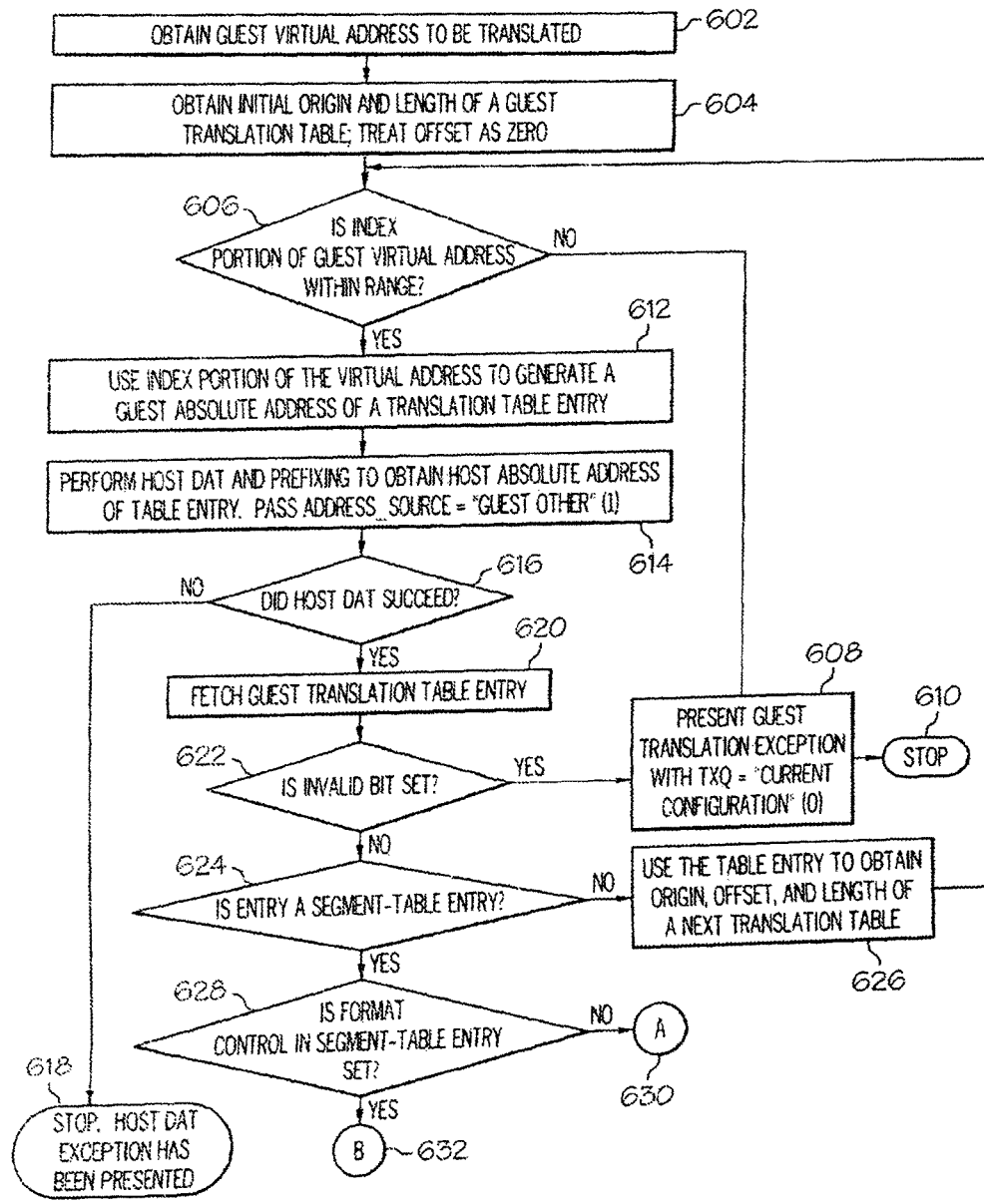
FIG. 6 illustrates a flow diagram of one embodiment of enhanced dynamic address translation (EDAT) at the guest level to obtain a format control field in a segment table entry.

Reference is now being made to FIG. 6 which illustrates a flow diagram of one embodiment of guest dynamic address translation to the point of obtaining a format control field from a guest segment table entry.

At 602, a guest virtual address to be translated is obtained. At 604, the origin address, table level, and table length of the highest translation table used in translation of the virtual address are obtained. The origin address of the first translation table used in translation is taken from the table origin field in the ASCE; the table level and table length depend on the DT and TL bits in the ASCE, respectively. The table offset for the highest translation table used is always treated as zero. At 606, an index portion of the guest virtual address to be used to reference the appropriate table entry in the translation table is first checked against the table offset and table length, which determine the minimum and maximum index values represented in the table. If, at 606, the index is outside this range, then further translation of the virtual address cannot proceed. In one embodiment, at 608, a guest translation exception is presented appropriate to the table level being indexed (for example, a region-first, region-second, region-third, or segment translation exception). Because this is a guest DAT exception encountered while executing the guest, the TXQ is set to zero to signify an exception at the current configuration level. The translation of this virtual address is then stopped, at 610. If, at 606, the index is within the valid range, then, at 612, the index multiplied by the table entry length is added to the table origin to generate the guest absolute address of a table entry. At 614, this guest absolute address is treated as a host virtual address, and host DAT and, when applicable, prefixing are invoked to obtain the corresponding host absolute address. An additional parameter to host DAT, to be used in generating a TXQ if needed, indicates that the source of the address to be translated is a guest address other than a page-frame real address or segment-frame absolute address. FIGS. 9-11, explained below, detail the host DAT process. If, at 616, the host DAT process failed, then at 618, the guest translation process is terminated; the host DAT process will have generated an exception. The TXQ for this host exception is determined as described in FIG. 9. If, at 616, the host DAT process succeeded, then at 620, the guest translation-table entry is fetched using the resulting host absolute address. At 622, the invalid (I) bit in the guest table entry is examined. If it is set, then further translation of the virtual address cannot proceed using the table entry because it has been marked as being invalid; at 608, a guest translation exception is presented, with a TXQ value indicating the current configuration, as above, and further translation of this virtual address using this segment table entry stops at 610. Otherwise, at 624, if the entry fetched from the guest translation table is not a segment table entry then the segment table in the hierarchy of translation tables has not yet been referenced. In this case, at 626, the origin, offset, and length of a next lower table in the hierarchy of guest translation tables is obtained from the table entry. Control returns to step 606, at which the next index field within the guest virtual address is checked against the new offset and length, and if within range, this index is used to reference the corresponding table entry in the next lower table used in translation.

For example, if the table origin address of the first guest translation table to be used in translation is a region first table then the RFX portion of the guest virtual address is used to reference a region first table entry with the region first table. If the table origin address is to a region second table then the RSX portion of the virtual address is used to reference a region second table entry within the region second table. If the table origin address is to a region third table then the RTX portion of the virtual address is used to reference a region third table entry within the region third table. If the table origin address is to a segment table then the SX portion of the virtual address is used to reference a segment table entry within the segment table. Successive tables are referenced until the segment table entry has been fetched.

Once the guest segment table entry has been fetched, at 628, the segment table entry (STE) format control bit is examined to determine if format control is set for this particular virtual address. If the STE format control is zero then dynamic address translation occurs with respect to node 630. If the STE format control is one then dynamic address translation occurs with respect to node 632.

Guest Dynamic Address Translation (STE Format Control is Zero)

Figure 7:
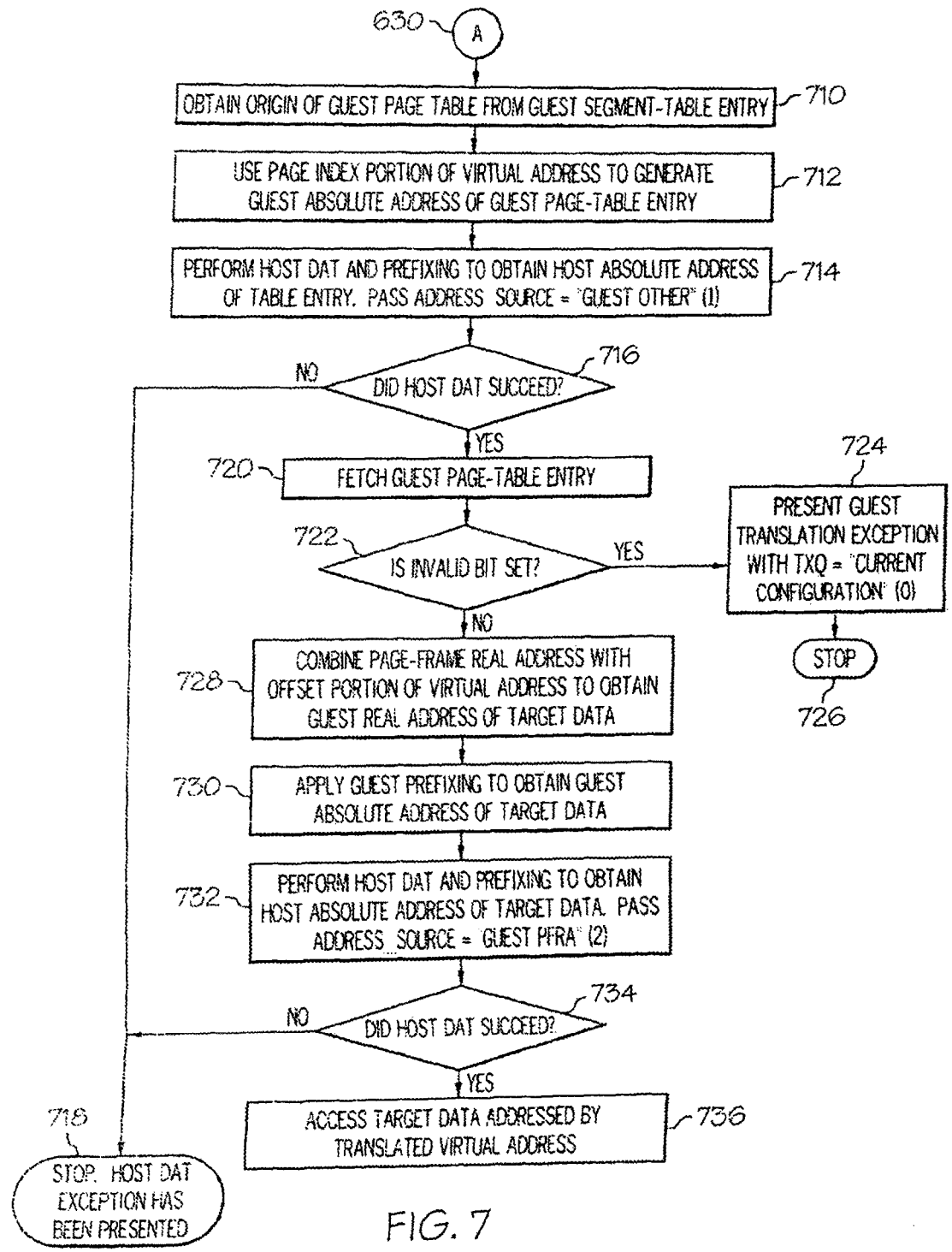
FIG. 7 illustrates a continuation of the flow diagram from node 630 of FIG. 6 when the guest STE format control is zero.

Reference is now being made to FIG. 7 which illustrates a continuation of the flow diagram from node 630 of FIG. 6 when the guest STE format control is zero.

At 710, an origin address to a guest page table is obtained from the guest segment table entry. At 712, a page index (PX) portion of the guest virtual address is multiplied by the table entry length and added to the guest page table origin to generate the guest absolute address of a guest page table entry. At 714, this guest absolute address is treated as a host virtual address, and host DAT and, when applicable, prefixing are invoked to obtain the corresponding host absolute address. An additional parameter to host DAT, to be used in generating a TXQ if needed, indicates that the source of the address to be translated is a guest address other than a page-frame real address or segment-frame absolute address. If, at 716, the host DAT process failed, then at 718, the guest translation process is terminated; the host DAT process will have generated an exception. If, at 716, the host DAT process succeeded, then at 720, the guest page table entry is fetched using the resulting host absolute address. An Invalid (I) bit is obtained from the guest page table entry. If, at 722, the Invalid (I) bit is one then, translation of the virtual address cannot continue using this page table entry because the entry has been marked as being invalid; at 724, a guest page translation exception is presented, with a TXQ value indicating the exception arises from translation at the current configuration level. Further translation of the virtual address using this page table entry stops, at 726. If, at 722, the Invalid (I) bit is zero then, at 728, the guest page frame real address (PFRA) from the guest page table entry is combined with a byte index (BX) portion of the guest virtual address to generate the guest real address corresponding to the input guest virtual address. At 730, this guest real address is further subject to a guest prefixing operation to form a guest absolute address. At 732, this guest absolute address is treated as a host virtual address, and host DAT and, when applicable, prefixing are invoked to obtain the corresponding host absolute address. An additional parameter to host DAT, to be used in generating a TXQ if needed, indicates that the source of the address to be translated is a guest page-frame real address. If, at 734, the host DAT process failed, then at 718, the guest translation process is terminated; the host DAT process will have generated an exception. If, at 734, the host DAT process succeeded, then at 736, the resulting host absolute address is used to access a block of data addressed by the translated guest virtual address.

Guest Dynamic Address Translation (STE Format Control is One)

Figure 8:
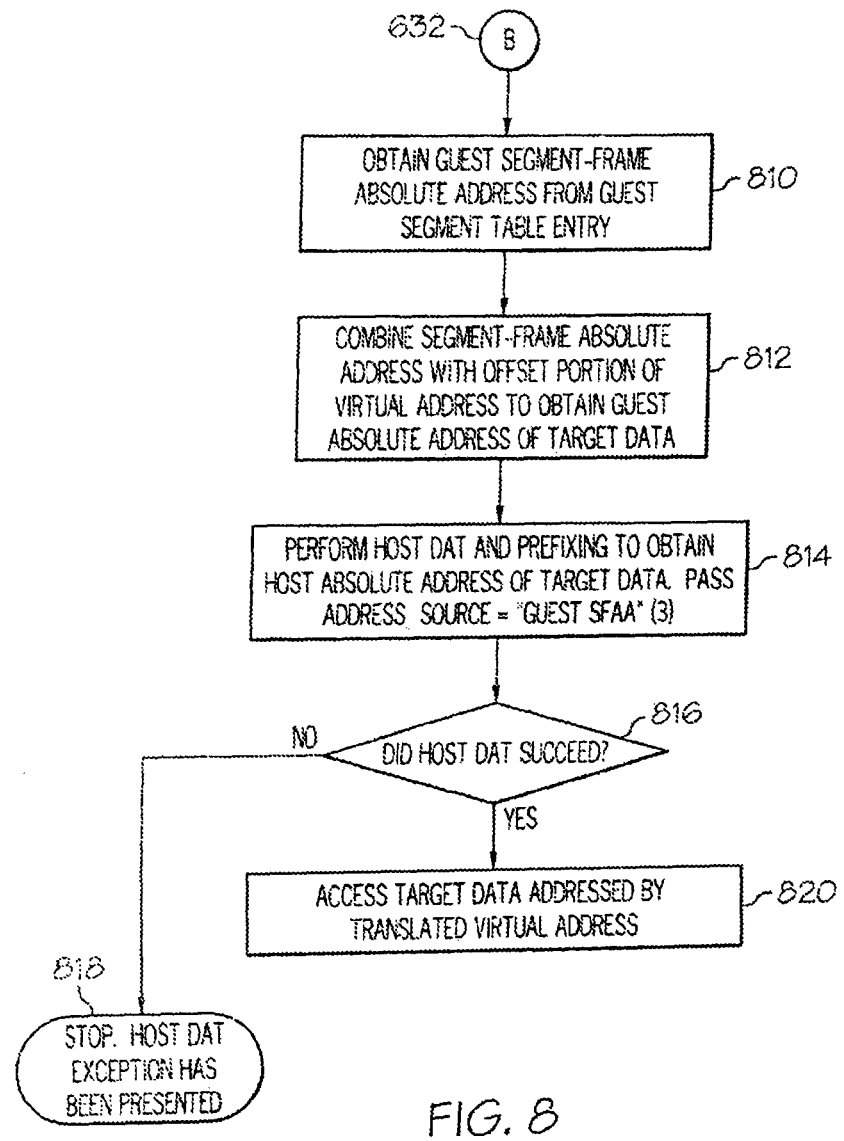
FIG. 8 illustrates a continuation of the flow diagram from node 632 of FIG. 6 when the guest STE format control is one.

Reference is now being made to FIG. 8 which illustrates a continuation of the flow diagram from node 632 of FIG. 6 when the guest STE format control is one.

At 810, a guest segment frame absolute address (SFAA) is obtained from a portion of the guest segment table entry. At 812, the guest segment frame absolute address (SFAA) is combined with the PX and BX portions of the guest virtual address to generate the guest absolute address of a desired block of data in main storage or in memory. At 814, this guest absolute address is treated as a host virtual address, and host DAT and, when applicable, prefixing are invoked to obtain the corresponding host absolute address. An additional parameter to host DAT, to be used in generating a TXQ if needed, indicates that the source of the address to be translated is a guest segment frame absolute address. If, at 816, the host DAT process failed, then at 818, the guest translation process is terminated; the host DAT process will have generated an exception. If, at 816, the host DAT process succeeded, then at 720, the resulting host absolute address is used to access the desired block of data addressed by the translated guest virtual address.

Host DAT

Reference is now being made to FIG. 9 which illustrates a flow diagram of one embodiment of host dynamic address translation at the host level, which may be invoked from the guest EDAT process, to obtain a format control field from a host segment table entry.

At 902, a host virtual address to be translated is obtained. At 904, the origin address, table level, and table length of the highest host translation table used in translation of the host virtual address are obtained. The origin address of the first host translation table used in translation is taken from the table origin field in the ASCE; the table level and table length depend on the DT and TL bits in the ASCE, respectively. The table offset for the highest translation table used is always treated as zero. At 906, an index portion of the host virtual address to be used to reference the appropriate table entry in the translation table is first checked against the table offset and table length, which determine the minimum and maximum index values represented in the table. If, at 906, the index is outside this range, then further translation of the virtual address cannot proceed; a host translation exception must be presented, appropriate to the table level being indexed (for example, a region-first, region-second, region-third, or segment translation exception). In one embodiment, at 908, a test is made of whether a guest program is currently executing. If not, that is, if the host is executing, then at 910, a host translation exception is presented with the TXQ set, for example, to zero, to signify an exception at the current configuration level. If instead a guest program is executing, then at 912, a host translation exception is presented with the TXQ set to the address source value passed from the guest translation operation. In either case, the translation process is then stopped, at 914.

If, at 906, the index is within the valid range, then, at 916, the index multiplied by the table entry length is added to the host table origin to generate the host absolute address of a host table entry. At 918, the host translation table entry is fetched using this host absolute address. At 920, the invalid (I) bit in the host table entry is examined. If it is set, then further translation of the virtual address cannot proceed using the table entry because it has been marked as being invalid; control is transferred to 908 to present a host translation exception with the appropriate TXQ value, as above, and further translation of this virtual address using this segment table entry stops. Otherwise, at 922, if the entry fetched from the translation table is not a segment table entry then the segment table in the hierarchy of translation tables has not yet been referenced. In this case, at 924, the origin, offset, and length of a next lower table in the hierarchy of host translation tables is obtained from the table entry. Control returns to step 906, at which the next index field within the host virtual address is checked against the new offset and length, and if within range, this index is used to reference the corresponding host table entry in the next lower table used in translation.

For example, if the table origin address of the first host translation table to be used in translation is a region first table then the RFX portion of the host virtual address is used to reference a region first table entry with the region first table. If the table origin address is to a region second table then the RSX portion of the virtual address is used to reference a region second table entry within the region second table. If the table origin address is to a region third table then the RTX portion of the virtual address is used to reference a region third table entry within the region third table. If the table origin address is to a segment table then the SX portion of the virtual address is used to reference a segment table entry within the segment table. Successive tables are referenced until the segment table entry has been fetched.

Once the host segment table entry has been fetched, at 926, the segment table entry (STE) format control bit is examined to determine if format control is set for this particular virtual address. If the STE format control is zero then dynamic address translation occurs with respect to node 928. If the STE format control is one then dynamic address translation occurs with respect to node 930.

Host Dynamic Address Translation (STE Format Control is Zero)

Reference is now being made to FIG. 10 which illustrates a continuation of the flow diagram from node 928 of FIG. 9 when the host STE format control is zero.

At 1002, an origin address to a host page table is obtained from the host segment table entry. At 1004, a page index (PX) portion of the host virtual address is multiplied by the table entry length and added to the page table origin to generate the host absolute address of a host page table entry. At 1006, the host page table entry is fetched using this host absolute address. An Invalid (I) bit is obtained from the host page table entry. If, at 1008, the Invalid (I) bit is one then, translation of the virtual address cannot continue using this page table entry because the entry has been marked as being invalid; control is transferred to 940 in FIG. 9, to present a host translation exception with the appropriate TXQ value, as above, and further translation of this virtual address using this page table entry stops. If, at 1008, the Invalid (I) bit is zero then, at 1010, the host page frame real address (PFRA) from the page table entry is combined with the byte index (BX) portion of the host virtual address to generate the host real address corresponding to the input host virtual address. At 1012, this host real address is further subject to a host prefixing operation to form a host absolute address. At 1014, this host absolute address is returned as the result of the host address translation, to be used, for example, in the guest DAT process which invoked it, or if none, then to access the target data during host execution.

Host Dynamic Address Translation (STE Format Control is One)

Reference is now being made to FIG. 11 which illustrates a continuation of the flow diagram from node 930 of FIG. 9 when the host STE format control is one.

At 1102, a host segment frame absolute address (SFAA) is obtained from a portion of the host segment table entry. At 1104, the host segment frame absolute address (SFAA) is combined with the PX and BX portions of the host virtual address to generate the host absolute address of a desired block of data in main storage or in memory. At 1106, this host absolute address is returned as the result of the host address translation, to be used, for example, in the guest DAT process which invoked it, or if none, then to access the target data during host execution.

The translation exception qualifier (TXQ) field is thus capable of indicating that the interruption was caused by an address contained in a guest leaf table entry and if so, whether the leaf entry was a segment table entry or a page table entry; that is, whether the exception was associated with a host virtual address derived from a guest page frame real address or was associated with a host virtual address derived from a guest segment frame absolute address. The TXQ field is thereby capable of indicating the proper size of host frame with which to back a guest frame. It is further capable of indicating that a larger frame size is needed, e.g. 2 Gigabyte or larger.

Commercial Implementation

Although the z/Architecture® by IBM® is mentioned herein, one or more aspects of the present invention are equally applicable to other machine architectures and/or computing environments employing pageable entities or similar constructs.

Commercial implementations of the EDAT facility, the TXQ, and other formats, instructions, and attributes disclosed herein can be implemented either in hardware or by programmers, such as operating system programmers, writing in, for example, assembly language. Such programming instructions may be stored on a storage medium intended to be executed natively in a computing environment such as the IBM® System z server, or alternatively in machines executing other architectures. The instructions can be emulated in existing and in future servers and on other machines or mainframes. They can be executed in machines where generally execution is in an emulation mode.

In emulation mode, the specific instruction being emulated is decoded, and a subroutine is executed to implement the individual instruction, as in a subroutine or driver, or some other technique is used for providing a driver for the specific hardware, as is within the skill of those in the art after understanding the description hereof. Various software and hardware emulation techniques are described in numerous United States patents including: U.S. Pat. Nos. 5,551,013, 5,574,873, 5,790,825, 6,009,261, 6,308,255, and 6,463,582, each of which is incorporated herein by reference. Many other teachings further illustrate a variety of ways to achieve emulation of an instruction set architected for a target machine.

Other Variations and Architectures

The various embodiments described herein are just examples. There may be many variations to these embodiments without departing from the spirit of the present invention.

One or more of the capabilities of the present invention can be implemented in software, firmware, hardware, or some combination thereof. Aspects of the invention are beneficial to many types of environments, including other environments that have a plurality of zones, and non-partitioned environments. Further, there may be no central processor complexes, but yet, multiple processors coupled together. Various aspects hereof are applicable to single processor environments.

Although particular environments are described herein, again, many variations to these environments can be implemented without departing from the spirit of the present invention. For example, if the environment is logically partitioned, then more or fewer logical partitions may be included in the environment. Further, there may be multiple central processing complexes coupled together. These are only some of the variations that can be made without departing from the spirit of the present invention. Additionally, other variations are possible.

Although the term 'page' is used to refer to a fixed size or a predefined size area of storage, the size of a page can vary. Similarly, the size of a block can vary. There may be different sizes of blocks and/or pages. A page may be equivalent to a block. Other structures may be alternatively used or otherwise implemented through software and/or hardware. Further, in the examples described herein, there may be many variations, including, but not limited to different sized words or addresses; a different number of bits; bits in a different order; more, fewer or different bits; more, fewer or different fields; fields in a differing order; different sizes of fields; etc. Again, these are only provided as an example. Many variations are possible.

A possible variation on the translation process described here is to treat the DAT table entry addresses as real rather than absolute addresses. Another possible variation is to perform a transformation between guest absolute and host virtual addresses, such as adding a guest main-storage origin or testing against a guest main-storage limit, so as to restrict guest absolute storage to a desired portion of the containing host address space. Yet another variation would allow for guest absolute addresses to be referenced in multiple host address spaces, selected, for example, by access register contents.

A processing unit includes pageable entities, such as guests, hosts, other processors, emulators, virtual machines, and/or other similar constructs. A buffer includes an area of storage and/or memory as well as different types of data structures including, but not limited to, arrays or pageable entities. A table can include other data structures as well. An instruction can reference other registers. Moreover, a page, a segment, and/or a region can be of varying sizes different than those described herein.

One or more aspects of the present invention can be included in an article of manufacture (e.g., one or more computer program products) having, for instance, computer usable or machine readable media. The media has embodied therein, for instance, computer readable program code means or logic (e.g., instructions, code, commands, etc.) to provide and facilitate the capabilities of the present invention. The article of manufacture can be included as a part of a computer system or sold separately. Additionally, at least one program storage device readable by a machine embodying at least one program of instructions executable by the machine to perform the capabilities of the present invention can be provided.

The flow diagrams depicted herein are illustrative. There may be many variations to these diagrams or the steps or operations described without departing from the spirit of the invention. For instance, the steps may be performed in a differing order, or steps may be added, deleted or modified. All of these variations are considered a part of the invention as claimed.

Although embodiments hereof have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer implemented method for qualifying a translation exception in a dynamic address translation (DAT) facility configured to translate a program address into a translated address of a desired block of host main storage in a computer system, comprising:
translating the program address into an address of a desired block of main storage; and
based on a translation exception event having occurred during said translating of the program address, storing a translation exception qualifier (TXQ) to indicate whether the translation exception event relates to a host DAT exception or a guest DAT exception, said TXQ indicating with a first value that an exception was caused by a currently executing configuration, with a second value that the exception was associated with a host virtual address derived from a guest page frame real address, with a third value that the exception was associated with a host virtual address derived from a guest segment frame absolute address, and with a fourth value that the exception was associated with a host virtual address derived from a guest address other than a guest page frame real address or a guest segment frame absolute address.

2. The method according to claim 1, wherein the computer system comprises a host machine and a guest virtual machine (VM), the guest VM being provisioned with virtual resources by a host program of the host machine, the host machine having host resources including host main storage, the guest VM comprising a guest operating system, the virtual resources comprising guest main storage, wherein the program address comprises a guest referenced address referenced by said guest program or a host referenced address referenced by said host program, the guest referenced address for determining a corresponding guest address of a block of guest main storage, the method comprising:
based on the program address comprising the host referenced address, performing a host DAT comprising:
based on host DAT tables, dynamically translating the host referenced address to determine the address of the desired block of host main storage.

3. The method according to claim 2, further comprising:
based on the program address comprising the guest referenced address, performing a guest DAT comprising:
based on one or more of guest DAT tables and host DAT tables, dynamically translating the guest referenced address to determine the address of the desired block of host main storage; and
based on a translation exception event having occurred during said translating of the program address, creating the translation exception qualifier (TXQ) to indicate whether said translation exception event relates to said host DAT exception, or said guest DAT exception.

4. The method according to claim 3, wherein the translation exception event is caused by dynamic address translation based on the host DAT tables, the method further comprising, responsive to the program address being the guest referenced address and the dynamically translating the guest referenced address being based on both the guest DAT tables and the host DAT tables, performing:
based on the guest DAT tables, translating the guest referenced address to determine the guest address of the block of guest main storage and based on the host DAT tables, translating the guest address of the block of guest main storage to determine the host address of the desired block of host main storage, wherein the guest address of the block of guest main storage comprises any one of a guest page frame real address obtained from a guest page table entry, or a guest segment frame absolute address obtained from a guest segment table entry, the guest segment table entry having the guest segment frame absolute address and an enabled format control (FC) field, the page frame real address subject to prefixing to form a real address.

5. The method according to claim 4, further comprising storing said TXQ to indicate that said translation exception event was caused by said host referenced address encountering a host DAT exception, the TXQ having a value of 0.

6. The method according to claim 4, further comprising storing said TXQ to indicate that said translation exception event pertained to host DAT translation of a host virtual address derived from said guest referenced address, the host virtual address not being derived from the guest page table entry or the guest segment table entry comprising the enabled FC field, the TXQ having a value of 1.

7. The method according to claim 4, further comprising storing said TXQ to indicate that said translation exception event pertained to host DAT translation of a host virtual address derived from said guest referenced address, the host virtual address comprising said guest page frame real address, the TXQ having a value of 2.

8. The method according to claim 4, further comprising storing said TXQ to indicate that said translation exception event pertained to host DAT translation of a host virtual address derived from said guest referenced address, the host virtual address comprising said guest segment frame absolute address, the TXQ having a value of 3.

9. A system for qualifying a translation exception in a dynamic address translation (DAT) facility configured to translate a program address into a translated address of a desired block of host main storage in a computer system, the system comprising:
a computer memory configured to store machine instructions and a hierarchy of translation tables used for dynamic address translation of a virtual address into a real address or absolute address of a desired block of data in said main storage; and
a processor in communication with said computer memory, said processor configured to access said hierarchy of translation tables stored in said memory, said system configured to perform a method comprising:
translating the program address into an address of a desired block of main storage; and
based on a translation exception event having occurred during said translating of the program address, storing a translation exception qualifier (TXQ) to indicate whether the translation exception event relates to a host DAT exception or a guest DAT exception, said TXQ indicating with a first value that an exception was caused by a currently executing configuration, with a second value that the exception was associated with a host virtual address derived from a guest page frame real address, with a third value that the exception was associated with a host virtual address derived from a guest segment frame absolute address, and with a fourth value that the exception was associated with a host virtual address derived from a guest address other than a guest page frame real address or a guest segment frame absolute address.

10. The system according to claim 9, wherein the computer system comprises a host machine and a guest virtual machine (VM), the guest VM being provisioned with virtual resources by a host program of the host machine, the host machine having host resources including host main storage, the guest VM comprising a guest operating system, the virtual resources comprising guest main storage, wherein the program address comprises a guest referenced address referenced by said guest program or a host referenced address referenced by said host program, the guest referenced address for determining a corresponding guest address of a block of guest main storage, the method comprising:
  based on the program address comprising the host referenced address, performing a host DAT comprising:
  based on host DAT tables, dynamically translating the host referenced address to determine the address of the desired block of host main storage.

11. The system according to claim 10, the method further comprising:
  based on the program address comprising the guest referenced address, performing a guest DAT comprising:
  based on one or more of guest DAT tables and host DAT tables, dynamically translating the guest referenced address to determine the address of the desired block of host main storage; and
  based on a translation exception event having occurred during said translating of the program address, creating the translation exception qualifier (TXQ) to indicate whether said translation exception event relates to said host DAT exception, or said guest DAT exception.

12. The system according to claim 11, wherein the translation exception event is caused by dynamic address translation based on the host DAT tables, the method further comprising, responsive to the program address being the guest referenced address and the dynamically translating the guest referenced address being based on both the guest DAT tables and the host DAT tables, performing:
  based on the guest DAT tables, translating the guest referenced address to determine the guest address of the block of guest main storage and based on the host DAT tables, translating the guest address of the block of guest main storage to determine the host address of the desired block of host main storage, wherein the guest address of the block of guest main storage comprises any one of a guest page frame real address obtained from a guest page table entry, or a guest segment frame absolute address obtained from a guest segment table entry, the guest segment table entry having the guest segment frame absolute address and an enabled format control (FC) field, the page frame real address subject to prefixing to form a real address.

13. The system according to claim 12, the method further comprising storing said TXQ to indicate that said translation exception event was caused by said host referenced address encountering a host DAT exception, the TXQ having a value of 0.

14. The system according to claim 12, the method further comprising storing said TXQ to indicate that said translation exception event pertained to host DAT translation of a host virtual address derived from said guest referenced address, the host virtual address not being derived from the guest page table entry or the guest segment table entry comprising the enabled FC field, the TXQ having a value of 1.

15. The system according to claim 12, the method further comprising storing said TXQ to indicate that said translation exception event pertained to host DAT translation of a host virtual address derived from said guest referenced address, the host virtual address comprising said guest page frame real address, the TXQ having a value of 2.

16. The system according to claim 12, the method further comprising storing said TXQ to indicate that said translation exception event pertained to host DAT translation of a host virtual address derived from said guest referenced address, the host virtual address comprising said guest segment frame absolute address, the TXQ having a value of 3.

17. A computer program product for qualifying a translation exception in a dynamic address translation (DAT) facility configured to translate a program address into a translated address of a desired block of host main storage in a computer system, the computer system comprising a host machine and a guest virtual machine (VM), the guest VM being provisioned with virtual resources by a host program of the host machine, the host machine having host resources including host main storage, the guest VM comprising a guest operating system, the virtual resources comprising guest main storage, the computer program product comprising:
  a non-transitory storage medium readable by said computer system, said storage medium storing instructions for performing a method comprising:
  translating the program address into an address of a desired block of main storage; and
  based on a translation exception event having occurred during said translating of the program address, storing a translation exception qualifier (TXQ) to indicate whether the translation exception event relates to a host DAT exception or a guest DAT exception, said TXQ indicating with a first value that an exception was caused by a currently executing configuration, with a second value that the exception was associated with a host virtual address derived from a guest page frame real address, with a third value that the exception was associated with a host virtual address derived from a guest segment frame absolute address, and with a fourth value that the exception was associated with a host virtual address derived from a guest address other than a guest page frame real address or a guest segment frame absolute address.

18. The computer program product according to claim 17, wherein the computer system comprises a host machine and a guest virtual machine (VM), the guest VM being provisioned with virtual resources by a host program of the host machine, the host machine having host resources including host main storage, the guest VM comprising a guest operating system, the virtual resources comprising guest main storage, wherein the program address comprises a guest referenced address referenced by said guest program or a host referenced address referenced by said host program, the guest referenced address for determining a corresponding guest address of a block of guest main storage, the method comprising:
  based on the program address comprising the host referenced address, performing a host DAT comprising:
  based on host DAT tables, dynamically translating the host referenced address to determine the address of the desired block of host main storage.

19. The computer program product according to claim 18, the method further comprising:
  based on the program address comprising the guest referenced address, performing a guest DAT comprising:
  based on one or more of guest DAT tables and host DAT tables, dynamically translating the guest referenced address to determine the address of the desired block of host main storage; and
  based on a translation exception event having occurred during said translating of the program address, creating the translation exception qualifier (TXQ) to indicate whether said translation exception event relates to said host DAT exception, or said guest DAT exception.

20. The computer program product according to claim 19, wherein the translation exception event is caused by dynamic address translation based on the host DAT tables, the method further comprising, responsive to the program address being the guest referenced address and the dynamically translating the guest referenced address being based on both the guest DAT tables and the host DAT tables, performing:

- based on the guest DAT tables, translating the guest referenced address to determine the guest address of the block of guest main storage and based on the host DAT tables, translating the guest address of the block of guest main storage to determine the host address of the desired block of host main storage, wherein the guest address of the block of guest main storage comprises any one of a guest page frame real address obtained from a guest page table entry, or a guest segment frame absolute address obtained from a guest segment table entry, the guest segment table entry having the guest segment frame absolute address and an enabled format control (FC) field, the page frame real address subject to prefixing to form a real address.

* * * * *